US008259313B2

(12) United States Patent
Imai

(10) Patent No.: US 8,259,313 B2
(45) Date of Patent: Sep. 4, 2012

(54) IMAGE PROCESSING APPARATUS, METHOD, AND COMPUTER-READABLE MEDIUM STORING THE PROGRAM THEREOF

(75) Inventor: Hitoshi Imai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 674 days.

(21) Appl. No.: 12/433,870

(22) Filed: Apr. 30, 2009

(65) Prior Publication Data

US 2009/0284777 A1    Nov. 19, 2009

(30) Foreign Application Priority Data

May 15, 2008   (JP) ................................. 2008-128791

(51) Int. Cl.
*H04N 1/40* (2006.01)

(52) U.S. Cl. ...................................... 358/1.11; 358/1.18

(58) Field of Classification Search ................. 358/1.11, 358/1.17–1.18, 1.13, 1.9, 2.1, 468
See application file for complete search history.

(56) References Cited

U.S. PATENT DOCUMENTS 5,379,130 A * 1/1995 Wang et al. .................... 358/462
5,552,903 A * 9/1996 Sakai et al. .................... 358/500
5,588,073 A * 12/1996 Lee et al. ........................ 382/187

FOREIGN PATENT DOCUMENTS

JP        2006202197         8/2006

* cited by examiner

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

An image processing apparatus receives page description data, converts the page description data, thereby generating first intermediate data that is described for each object, converts the first intermediate data, thereby generating second intermediate data that is described with edge information of an object, stores, in a storage area, data representing drawing position information of an object, determines whether the object overlaps with and is located behind another object, in the case where it is determined that the object is located behind another object, performs character recognition processing on the first intermediate data, whereas in the case where it is determined that the object is not located behind another object, performs character recognition processing on the second intermediate data.

8 Claims, 24 Drawing Sheets

8A

GRAPHICS ATTRIBUTE
APPLICATION INSTRUCTION

ELLIPSE DRAWING INSTRUCTION :
OVERWRITE
  AREA INFORMATION : (X0, Y0) – (X1, Y1)
- - - - - - - - - - - - - - - - - - - - - - - -
TEXT ATTRIBUTE APPLICATION
INSTRUCTION

"A" DRAWING INSTRUCTION : OVERWRITE
  AREA INFORMATION : (X2, Y2) – (X3, Y3)

"B" DRAWING INSTRUCTION : OVERWRITE
  AREA INFORMATION : (X4, Y4) – (X5, Y5)

"C" DRAWING INSTRUCTION : OVERWRITE
  AREA INFORMATION : (X6, Y6) – (X7, Y7)

8B

FIG. 9
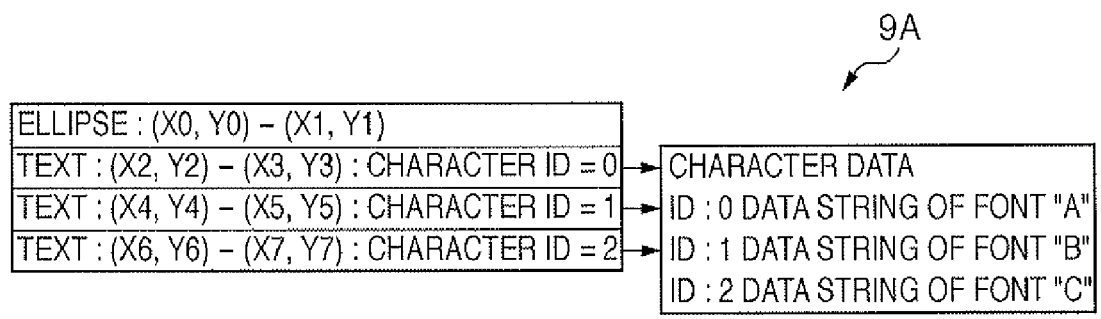
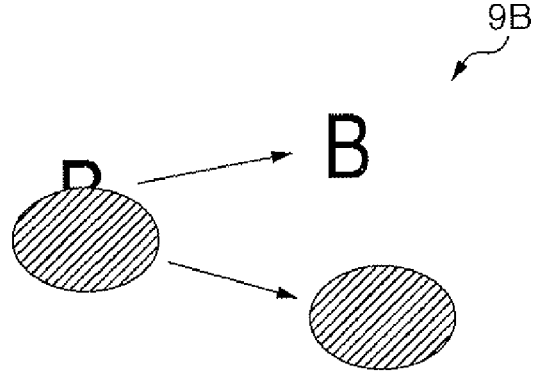

FIG. 10
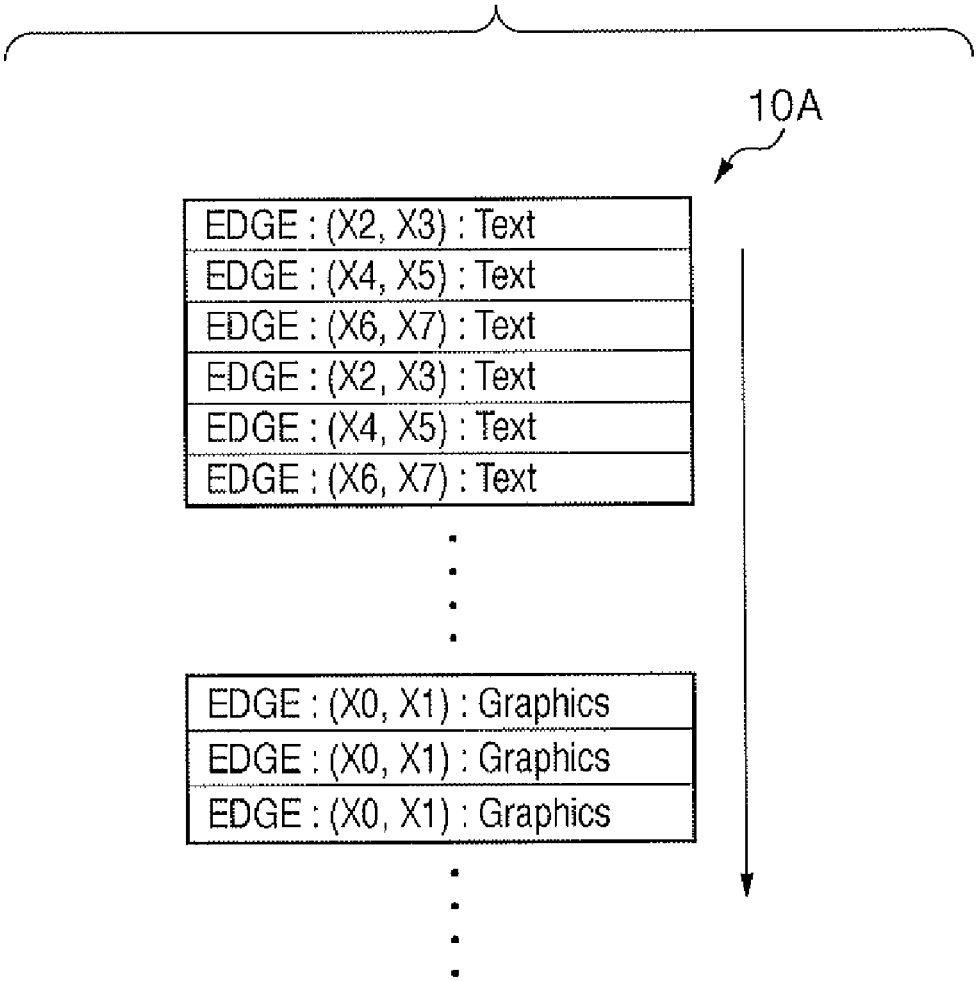
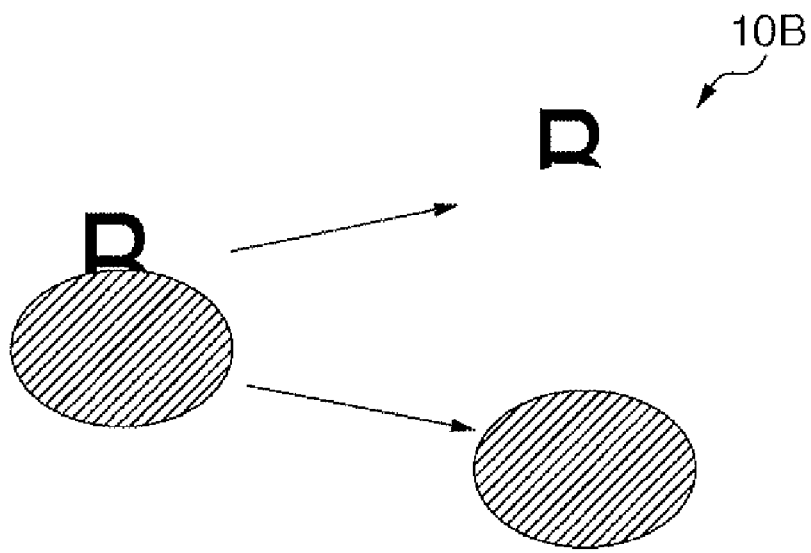

FIG. 13
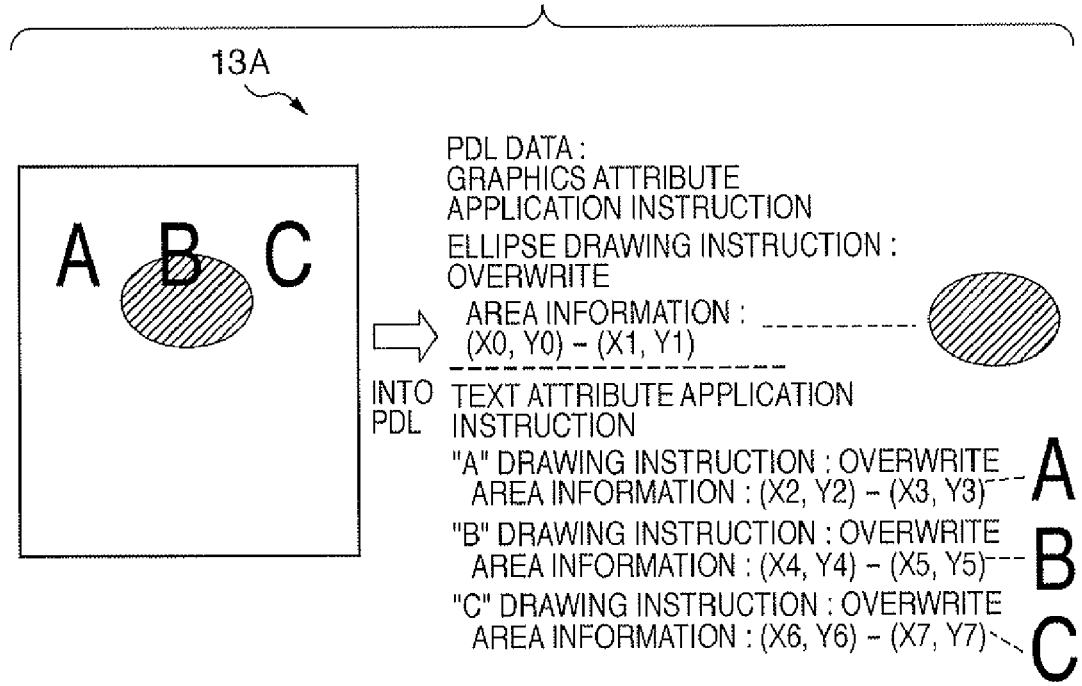
13A
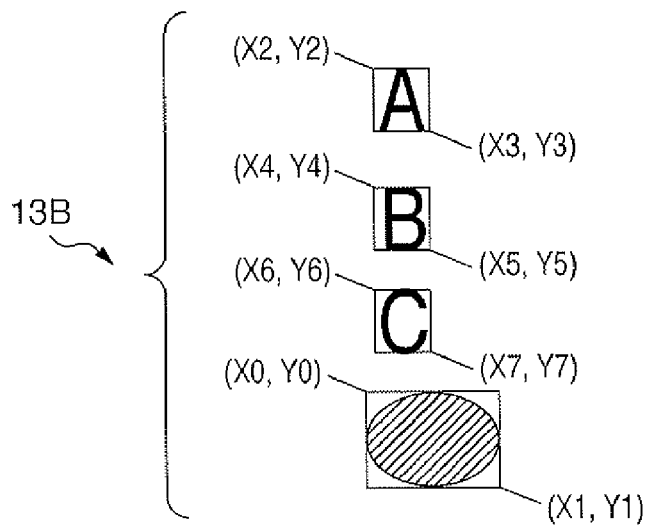
13B
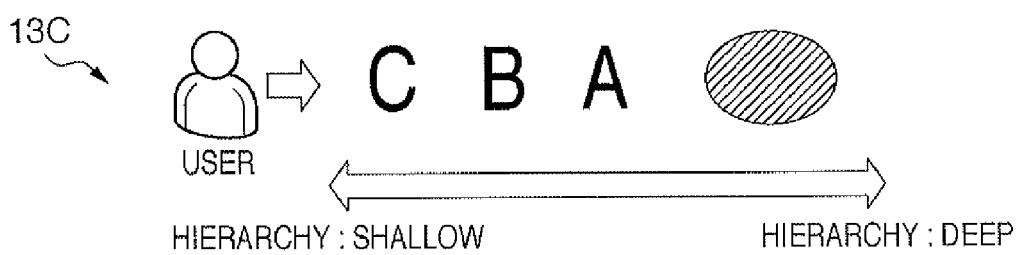

OUTLINE OF VECTOR HINT INFORMATION

23A 2301
2302

STRUCTURE OF VECTOR HINT INFORMATION

23B

VECTOR DATA FILE NAME : keiyakusho

CHARACTER STRING 1 :
"CONTRACT", "CONTRACT CONDITIONS", "1 : ABCDE", "2 : FGHIJ",
"3: KLMNO", "SIGNATURE"

CHARACTER STRING 2 : "TARO SUZUKI"

IMAGE PROCESSING APPARATUS, METHOD, AND COMPUTER-READABLE MEDIUM STORING THE PROGRAM THEREOF

BACKGROUND OF THE INVENTION

1. Field of the Invention

The present invention relates to an image processing apparatus, a methods and a medium for performing character recognition processing.

2. Description of the Related Art

Recently, image processing apparatuses that perform image processing based on page description data are being used widely. With an image processing system using such an image processing apparatus, page description data and scan data that have been input into the image processing apparatus can be held within the image processing apparatus or a network-connected server in a file format with which the information can be managed easily. Conversely, a target file, print job or the like held within the image processing apparatus or a network-connected server can be used as needed.

In such various modes of usage of image processing systems, a case can be envisaged where it is necessary to retrieve a target file from a plurality of files, for example. In such a case, a search is generally performed by specifying a feature included in the file as a search condition. For example, it is often the case that a character string included in the file is used as a feature (also referred to as "hint information") of the file that is specified at the time of search.

Various techniques concerning processing for recognizing a character string used for such hint information in a file have hitherto been developed. Japanese Patent Laid-Open No. 2006-202197 describes a method in which a print job is rendered, and character recognition processing is performed on the rendered bitmap data.

However, the following problems exist in character recognition processing performed on the rendered bitmap data. One problem is that the information amount (number of pixels) per character decreases as the character size decreases, which leads to a poor character recognition rate. The character recognition rate is reduced, for example, for smaller characters, such as footnotes in a catalogue.

Another possible problem is that character recognition cannot be performed on a character that has ended up behind another object. Here, such a problem will not occur in the case where scan data is input, but will occur in the case where notes have been added to an electronic document and the electronic document is printed with some characters hidden behind the notes. In addition, it is necessary to perform rendering processing, which results in a longer processing time required for performing character recognition processing considering the time elapsed until bitmap data is generated.

In the case where scan data is input, it is difficult to prevent the above-described problems. Here, in the case where page description language is input, it is conceivable to perform character recognition processing on various data prior to bit mapping, thereby preventing the above-described problems.

It is generally known that data that can be generated from input page description language is mainly classified into vector data and fill map data.

Character recognition processing on vector data is advantageous in that the success rate of character recognition processing is high, characters that are present behind an object can also be recognized, and breaks between characters can be easily recognized. However, it is disadvantageous in that the speed of character recognition processing is low.

The character recognition processing for fill map data is advantageous in that the success rate of the character recognition processing is high, and the speed of character recognition processing is high. However, it is disadvantageous in that characters that have ended up behind an object cannot be recognized, and breaks between characters are difficult to recognize.

As described above, the character recognition processes performed on various data generated from input page description language have their respective characteristics, and thus it is desirable for the character recognition processing to be performed in a flexible manner depending on the data.

SUMMARY OF THE INVENTION

The present invention provides an image processing apparatus capable of performing flexible and high-speed character recognition processing on data of inputted page description language.

The present invention in its first aspect provides an image processing apparatus that performs character recognition processing of recognizing a character included in a document, the apparatus including:

a receiving unit configured to receive page description data of the document;

a first intermediate data generating unit configured to convert the page description data received by the receiving unit, thereby generating first intermediate data that is described for each object;

a second intermediate data generating unit configured to convert the first intermediate data generated by the first intermediate data generating unit, thereby generating second intermediate data that is described with edge information of an object;

a first storage unit configured to store, in a storage area, data representing drawing position information of an object included in the document;

a first determining unit configured to, referring to the data representing the drawing position information of an object that is stored by the first storage unit, determine whether the object overlaps with and is located behind another object; and a character recognition unit configured to, in the case where it is determined that the object overlaps with and is located behind another object as a result of the determination by the first determining unit, perform character recognition processing on the first intermediate data generated by the first intermediate data generating unit, thereby recognizing a character of the object, and, in the case where it is determined that the object does not overlap with and is not located behind another object, perform character recognition processing on the second intermediate data generated by the second intermediate data generating unit, thereby recognizing a character of the object.

The present invention in its second aspect provides an image processing method performed in an image processing apparatus that performs character recognition processing of recognizing a character included in a document, the method including:

a receiving step of receiving page description data of the document;

a first intermediate data generating step of converting the page description data received in the receiving step, thereby generating first intermediate data that is described for each object;

a second intermediate data generating step of converting the first intermediate data generated in the first intermediate data generating step, thereby generating second intermediate data that is described with edge information of an object;

a first determining step of determining, referring to data representing drawing position information of an object included in the document, whether the object overlaps with and is located behind another object; and a character recognition step of, in the case where it is determined that the object included in the document overlaps with and is located behind another object as a result of the determination in the first determining step, performing character recognition processing on the first intermediate data generated in the first intermediate data generating step, thereby recognizing a character of the object, and, in the case where it is determined that the object included in the document doe not overlap with and is not located behind another object, performing character recognition processing on the second intermediate data generated in the second intermediate data generating step, thereby recognizing a character of the object.

The present invention in its third aspect provides a computer-readable medium storing an image processing program for performing character recognition processing of recognizing a character included in a document, the image processing program causing a computer to perform functions of:

receiving page description data of the document;

converting the received page description data, thereby generating first intermediate data that is described for each object;

converting the generated :first intermediate data, thereby generating second intermediate data that is described with edge information of an object;

determining, referring to data representing drawing position information of an object included in the document, whether the object overlaps with and is located behind another object; and, in the case where it is determined that the object included in the document overlaps with and is located behind another object as a result of the determination, performing character recognition processing on the generated first intermediate data, thereby recognizing a character of the object, and, in the case where it is determined that the object included in the document doe not overlap with and is not located behind another object, performing character recognition processing on the generated second intermediate data, thereby recognizing a character of the object.

According to the present invention, it is possible to perform flexible and high-speed character recognition processing on data of input page description language.

Further features of the present invention will become apparent from the following description of exemplary embodiments with reference to the attached drawings.

BRIEF DESCRIPTION OF THE DRAWINGS

FIG. 9 is a diagram illustrating an example of vector data according to an embodiment of the present invention.

FIG. 10 is a diagram illustrating an example of fill map data according to an embodiment of the present invention.

FIG. 13 is a diagram illustrating object drawing position information.

DESCRIPTION OF THE EMBODIMENTS

Figure 1:
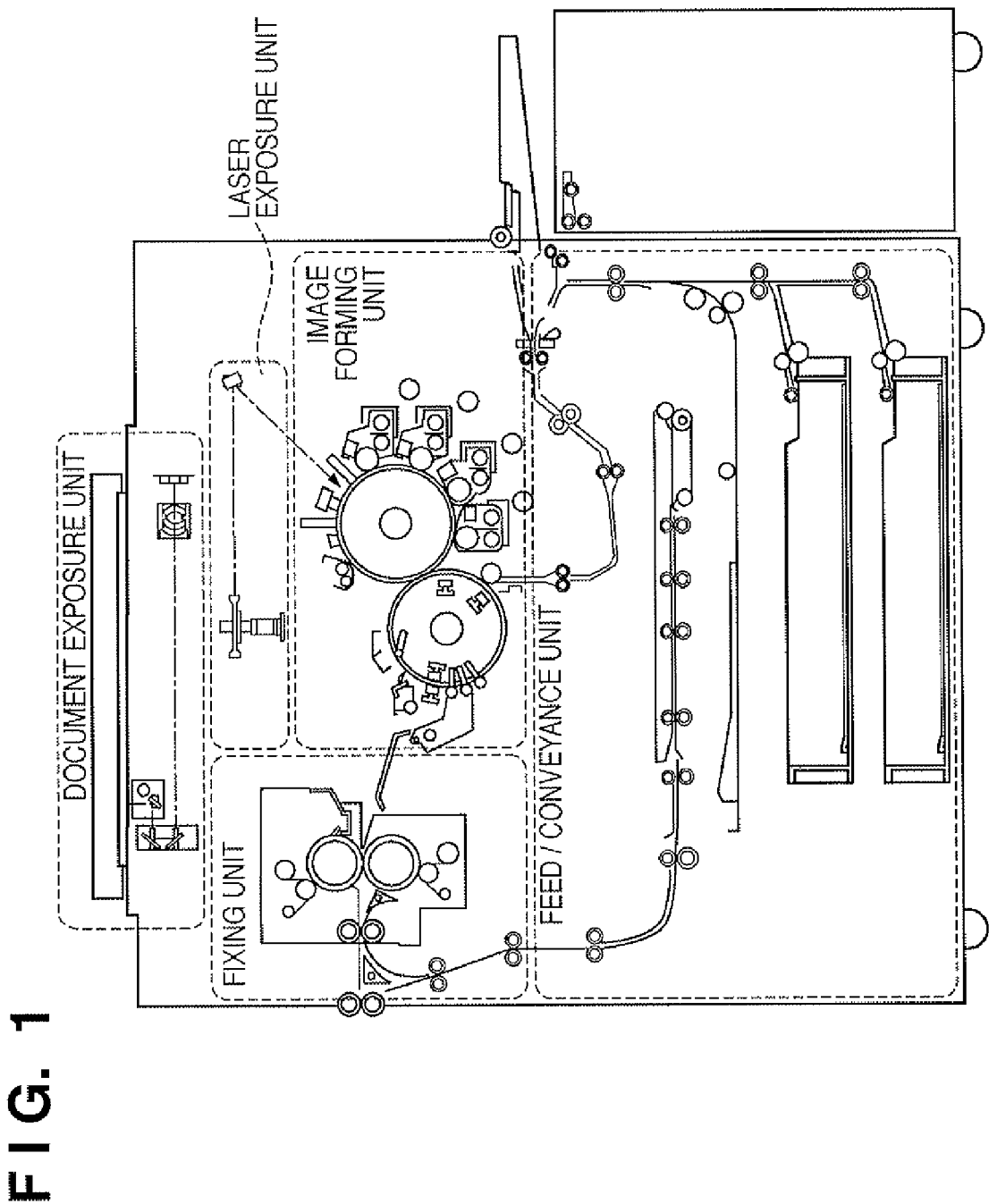
FIG. 1 is a diagram showing the configuration of an image processing apparatus according to an embodiment of the present invention.

Hereinafter, a preferred embodiment for carrying out the present invention will be described in detail with reference to the accompanying drawings. Note that identical components are denoted by identical reference numerals, and the descriptions thereof have been omitted.

Configuration of Image Processing Apparatus

FIG. 1 is a diagram showing the configuration of an image processing apparatus according to an embodiment of the present invention. Hereinafter, the configuration of a 1D color MFP (Multi-Function Peripheral) to which the present embodiment can be suitably applied will be described. The 1D color MFP includes a scanner unit (document exposure unit), a laser exposure unit, a photosensitive drum, an image forming unit, a fixing unit, and a feed/conveyance unit, as well as a printer controller (not shown) that controls these constituent elements.

The scanner unit (document exposure unit) generates image data by illuminating a document placed on a document platens optically reading an image of the document and converting the image to an electrical signal. The laser exposure unit causes a light beam, such as laser light modulated according to the image data, to be incident onto a rotating polygonal mirror that rotates at an equiangular velocity, and irradiates the photosensitive drum with reflected scanning light.

The image forming unit rotationally drives the photosensitive drum, charges the photosensitive drum using a charger, develops, using toner, a latent image formed on the photosensitive drum using the laser exposure unit, and transfers the developed toner image to a sheet. The small amount of toner remaining on the photosensitive drum without being transferred is recovered. A series of electrophotographic processes as described above are executed to form an image. The aforementioned electrophotographic processes are repeatedly executed sequentially by developing units (developing stations) that have magenta (M), cyan (C) yellow (Y), and black (K) toners in an alternating manner, while a sheet is wrapped around at a predetermined position of a transfer belt and rotated four times. The sheet to which the four color, full-color toner image has been transferred as a result of the transfer belt rotating four times is conveyed to the fixing unit after separating from the transfer drum.

The fixing unit is made up of a combination of rollers and a belt and incorporates a heat source such as a halogen heater. In addition, the fixing unit fuses and fixes the toner on the sheet to which the toner image has been transferred by the image forming unit, using heat and pressure. The feed/conveyance unit has one or more sheet repositories typified by sheet cassettes or paper decks. In addition, the feed/conveyance unit separates one sheet from the plurality of sheets housed in a sheet repository and conveys the sheet to the image forming unit and the fixing unit in accordance with an instruction from the printer controller. The sheet is wrapped around the transfer drum of the image forming unit and rotated four times, before being conveyed to the fixing unit. The aforementioned YMCK color toner image is transferred to the sheet during the four rotations. In the case of image forming on both sides of the sheet, the feed/conveyance unit performs control so that the sheet that has passed through the fixing unit again passes along the conveyance path to the image forming unit.

The printer controller, in communication with an MFP controller that performs overall control of the MFP, manages the state of the above-described scanner unit (document exposure unit), laser exposure unit, image forming unit, fixing unit, and feed/conveyance unit, while executing control so that these components operates smoothly as a whole in harmony with each other in accordance with instructions from the MFP controller.

Configuration of Controller Unit

Figure 2:
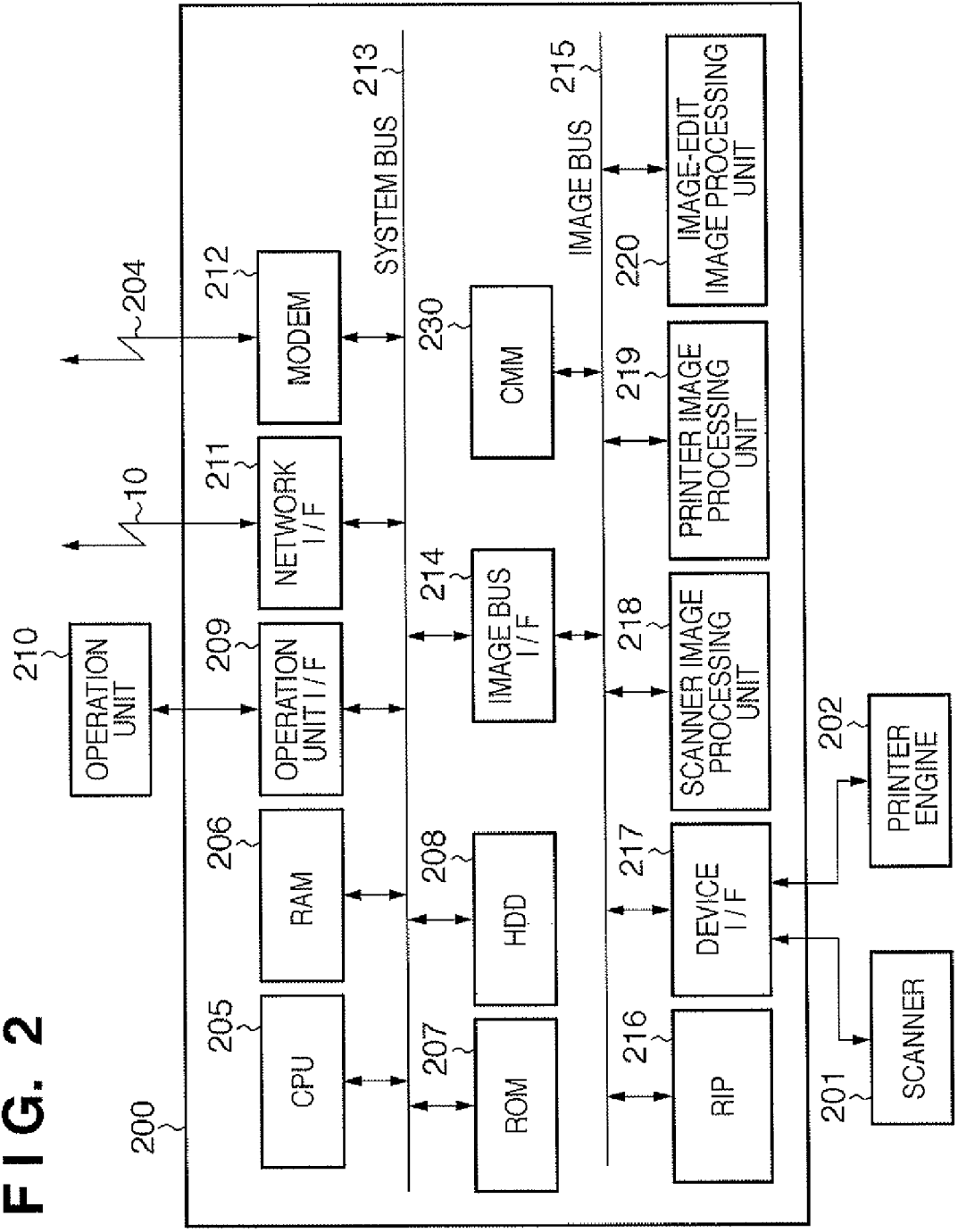
FIG. 2 is a diagram showing the block configuration of a control unit (controller) of an MFP according to an embodiment of the present invention.

FIG. 2 is a diagram showing the block configuration of a control unit (controller) of an MFP according to the present embodiment. The control unit 200 shown in FIG. 2 is connected to a scanner 201 serving as an image input device and a printer engine 202 serving as an image output device, and controls various internal blocks so as to perform reading and print output of image data. The control unit 200 is also connected to a LAN 10 and a public line 204, and controls the various internal blocks so as to input and output image information and device information via the LAN 10 and the public line 204.

A CPU 205 is a central processing unit for controlling the entire MFP. A RAM 206 is a system work memory used when the CPU 205 operates, and also acts as an image memory for temporarily storing input image data. In addition, a RON 207 is a boot ROM, in which the system boot program is stored. An HDD 208 is a hard disk drive, in which system software for various processes and input image data or the like are stored. An operation unit I/F 209 is an interface unit for an operation unit 210 having a display screen on which image data or the like is displayed, and outputs operation screen data to the operation unit 210. The operation unit I/F 209 also conveys information input by an operator through the operation unit 210 to the CPU 205. A network interface 211 is configured, for example, of a LAN card, which is connected to the LAN 10, and inputs and outputs information from and to an external apparatus. In addition, a modem 212 is connected to the public line 204, and inputs and outputs information to and from an external apparatus. The above-described blocks are disposed on a system bus 213, and controlled by the CPU 205.

An image bus I/F 214 is an interface for connecting the system bus 213 with an image bus 215 that transmits image data at high speed, and also is a bus bridge that converts data structures A raster image processor 216, a device I/F 217, a scanner image processing unit 218, a printer image processing unit 219, an image-edit image processing unit 220, and a CMM 230, which is a color management module, are connected to the image bus 215. The raster image processor 216 (indicated as "RIP" in FIG. 2) expands page description language (PDL) code and vector data, which will be described later, into an image. The device I/F 217 connects the scanner 201 and the printer engine 202 with the control unit 200, and synchronously or asynchronously converts image data. The scanner image processing unit 218 performs various processes such as correction, processing, and editing of image data input from the scanner 201. The printer image processing unit 219 performs correction, resolution conversion and other processes for print output image data that are suitable for the printer engine. The image-edit image processing unit 220 carries out various image processing such as image data rotation and image data compression and decompression. The CMM 230 is a dedicated hardware module for carrying out color conversion processing (also called color space conversion processing) on the image data based on a profile, calibration data, or the like. Here, "profile" refers to information such as a function for converting color image data represented by a device-dependent color space into a device-independent color space (e.g., Lab). "Calibration data" refers to data for correcting the color reproducing properties of the scanner 201 and the printer engine 202 in the color multi function peripheral.

Controller Software Configuration

Figure 3:
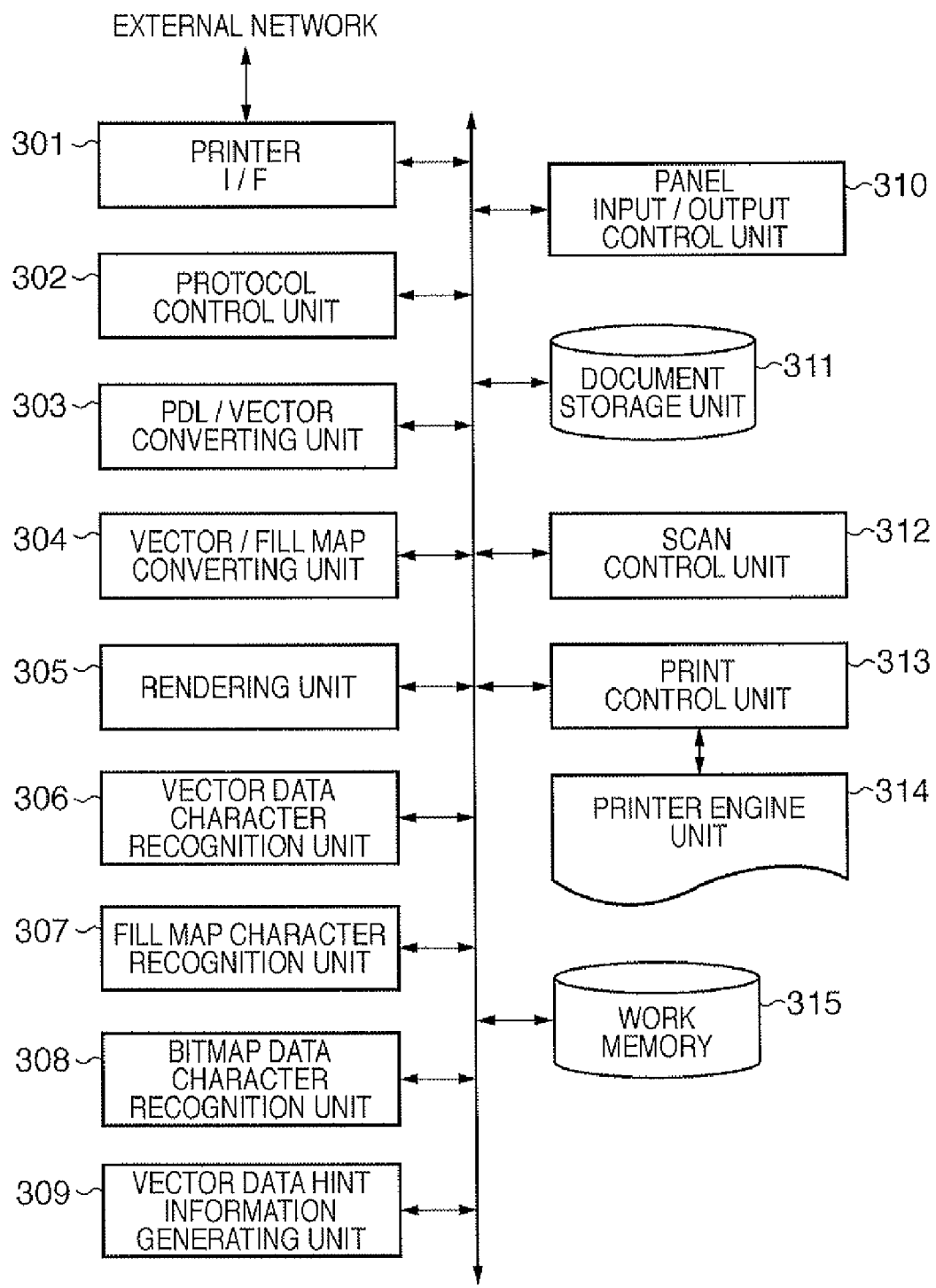
FIG. 3 is a diagram showing the block configuration of controller software that controls the operations of the MFP.

FIG. 3 is a diagram showing the block configuration of controller software that controls the operations of the MFP. A printer interface 301 performs input and output from and to the exterior of the apparatus. A protocol control unit 302 communicates with the exterior of the apparatus by analyzing a network protocol. A PDL/vector converting unit 303 interprets page description data (hereinafter, referred to as "PDL data"), and generates vector data, which is a resolution-independent drawing description (performs vectorization). A vector/fill map converting unit 304 interprets the generated vector data, and generates fill map data, which is resolution-independent fill area data. Fill map data is intermediate data generated from vector data, and will be described in relation to FIG. 10. A rendering unit 305 forms an image based on the fill area information indicated by the fill map data, and generates bitmap data (performs rendering). The generated bitmap data is stored in a work memory 315.

A vector data character recognition unit 306 performs character recognition by analyzing vector data. A fill map character recognition unit 307 performs character recognition by analyzing fill map data. A bitmap data character recognition unit 308 performs character recognition by analyzing bitmap data. A vector data hint information generating unit 309 associates a character string obtained by the vector data character recognition unit 306, the fill map character recognition unit 307 or the bitmap data character recognition unit 308 with vector data, thereby generating vector data hint information. The vector data hint information will be described later.

A panel input/output control unit 310 controls input from the operation panel and output to the operation panel. A document storage unit 311 stores the vector data and the vector data hint information, and is configured of a storage device such as a hard disk. A print control unit 313 converts the rendering data stored for each page in the work memory 315 into a video signal when forming a permanent visible image on recording paper, and the signal is transferred in the form of an image to a printer engine unit 314.

The printer engine unit 314 is a print station unit for forming a permanent visible image of the video signal transferred in the form of an image on recording paper. A scan control unit 312 controls the operations of the scanner. The work memory 315 temporarily stores various data handled in the software processing performed in the MFP, and is configured of a storage device such as a DRAM.

System Configuration

Figure 4:
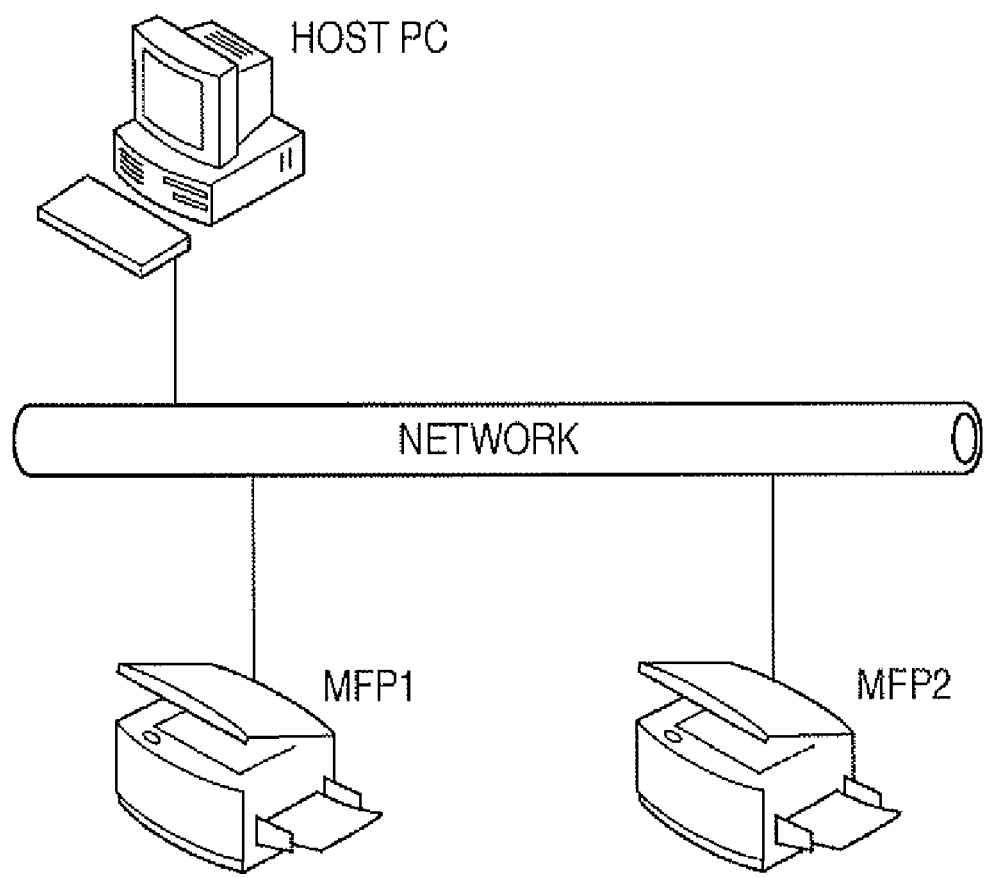
FIG. 4 is a diagram showing the overall configuration of an image processing system that includes an image processing apparatus according to an embodiment of the present invention.

FIG. 4 is a diagram showing the overall configuration of an image processing system that includes an image processing apparatus according to the present embodiment. As shown in FIG. 4, a host PC, an MFP 1, and an MFP 2 are connected via a network. In a basic mode of usage in which a user wishes to print a target document, the user provides a print instruction to the MFP the user wishes to perform output, through the host PC or that MFP. The host PC or MFP that has received the print instruction generates PDL data from the document, and performs printing by transferring that PDL data to the MFP that is used for printing.

Meanwhile, in an advanced mode of use, the user saves a document on the MFPs (alternatively, on the server or the host PC) and prints the document as needed. A method for saving a document on the MFPs according to the present embodiment (hereinafter, referred to as a "box" functionality) will now be described. In the case where the user wishes to perform saving onto a box, the user needs to save a document on that box using the same method as in the basic mode of use. That is, the user provides a box save instruction to an MFP that the user wishes to designate as the box save destination. The host PC or MFP that has received the box save instruction generates PDL data from the document, and transfers the generated PDL data to the MFP that performs box saving. The MFP that has received the PDL data converts the PDL data into data suitable for storage, and stores that data in the document storage unit 311. In the case where the user wises to print the stored document, the user specifies the file name of the document, or performs a search using a character string included in the document, and prints the target document.

Data Flow of Character Recognition Processing

Hereinafter, an outline of data flow up to character recognition processing according to the present embodiment will be described. In the present embodiment, three types of character recognition processing can be performed depending on the situation. First, an outline of the data flow will be described individually for the cases in which these types of character recognition processing are performed.

Figure 5:
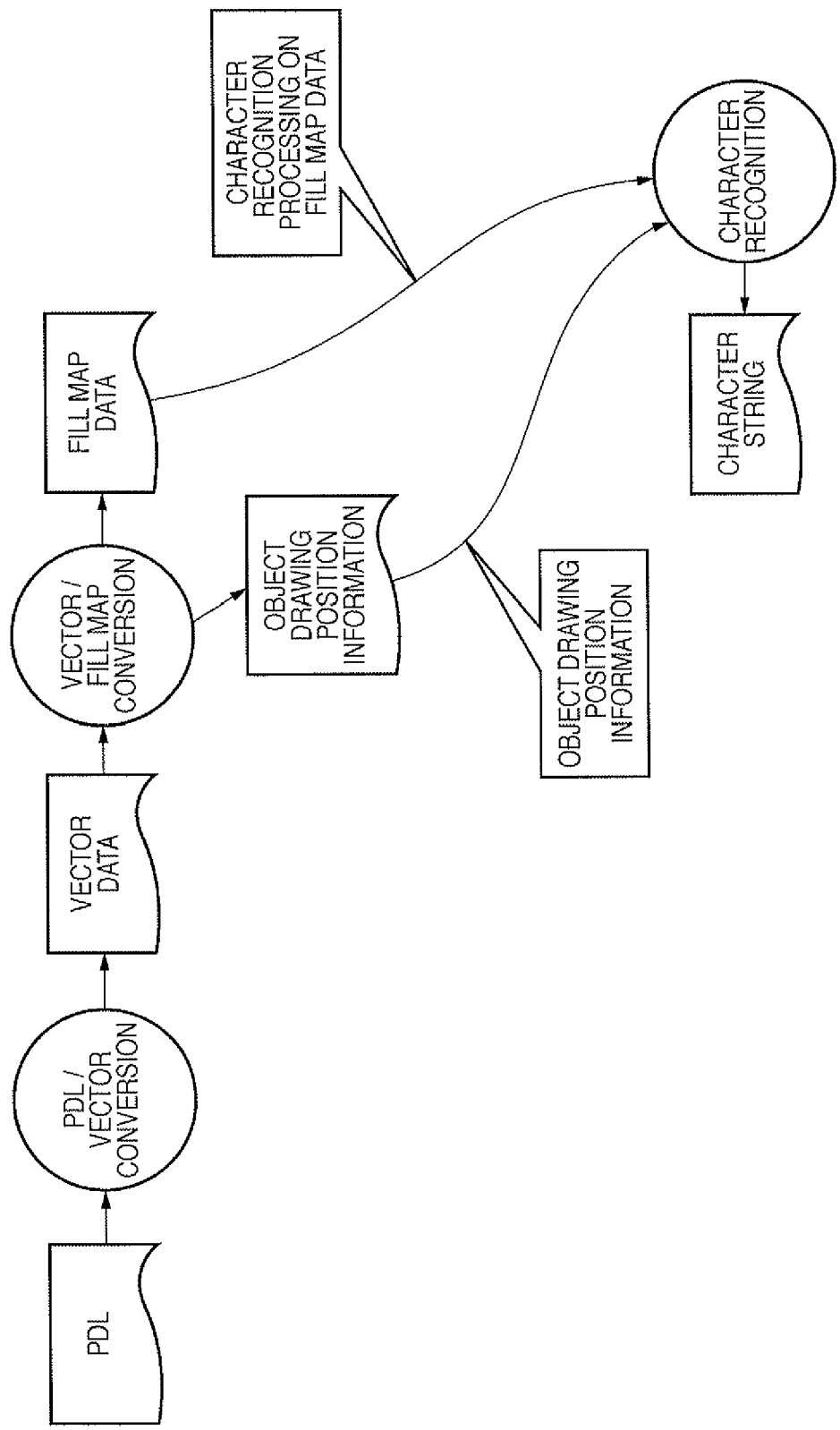
FIG. 5 is a diagram illustrating a case where character recognition processing is performed on fill map data.

FIG. 5 is a diagram illustrating a case where character recognition processing is performed on fill map data. As shown in FIG. 5, character recognition processing is performed on fill map data generated from vector data. The fill map data will be described later with reference to FIG. 10.

First, the image processing apparatus performs PDL/vector conversion processing on the received PDL data, thereby generating vector data. Further, the image processing apparatus performs vector/fill map conversion processing on the generated vector data, thereby generating fill map data, and also extracts "object drawing position information" from the vector data. Both of the vector data and the fill map data are intermediate data generated from the PDL data. The vector data is one example of first intermediate data in the present embodiment, and the fill map data is one example of second intermediate data in the present embodiment. The object drawing position information will be described later. The image processing apparatus performs character recognition processing on the fill map data, referring to the object drawing position information, and extracts a character string.

Figure 6:
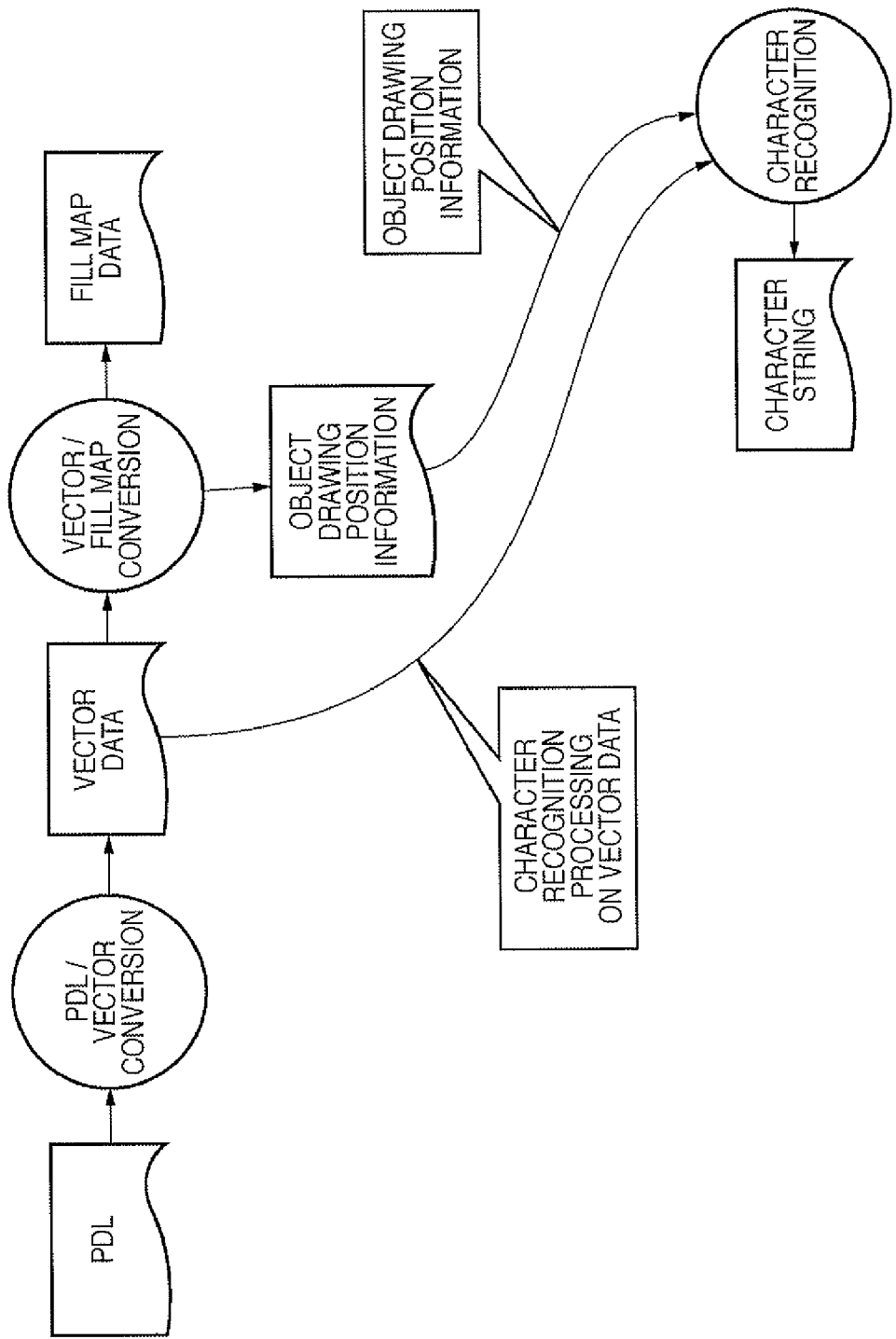
FIG. 6 is a diagram illustrating a case where character recognition processing is performed on vector data.

FIG. 6 is a diagram illustrating a case where character recognition processing is performed on vector data. As shown in FIG. 6, character recognition processing is performed on vector data.

First, the image processing apparatus performs PDL/vector conversion processing on the received PDL data, thereby generating vector data. Further, the image processing apparatus performs vector/fill map conversion processing on the generated vector data, thereby generating fill map data, and also extracts object drawing position information from the vector data.

Here, the image processing apparatus determines whether a target object has ended up located behind another object, referring to the object drawing position information. If it is determined that the target object has ended up behind another object, the image processing apparatus performs character recognition processing on the vector data, and extracts a character string.

Figure 7:
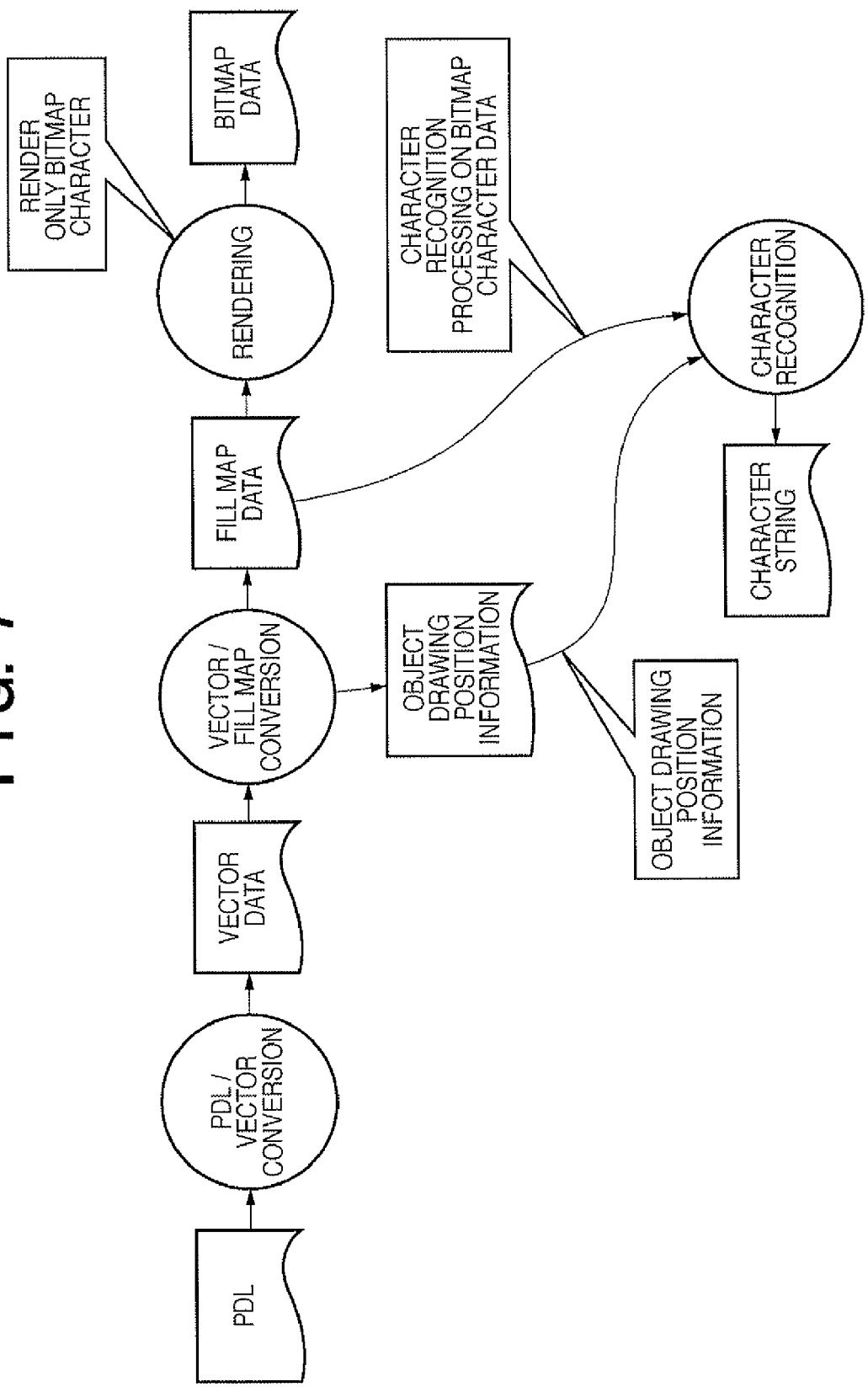
FIG. 7 is a diagram illustrating a case where character recognition processing is performed on bitmap data.

FIG. 7 is a diagram illustrating a case where character recognition processing is performed on bitmap data. As shown in FIG. 7, character recognition processing is performed on bitmap data.

First, the image processing apparatus performs PDL/vector conversion processing on the received PDL data, thereby generating vector data. Further, the image processing apparatus performs vector/fill map conversion processing on the generated vector data, thereby generating fill map data, and also extracts object drawing position information from the vector data.

Here, the image processing apparatus refers to the fill map data, and, in the case where a drawing instruction for a text and a drawing instruction for an image coexist, performs rendering on the fill map data, and generates bitmap data. The image processing apparatus then performs character recognition processing on the bitmap data, and extracts a character string.

Description of Data Structure

Various data sets that are generated according to the present embodiment will now be described.

Figure 8:
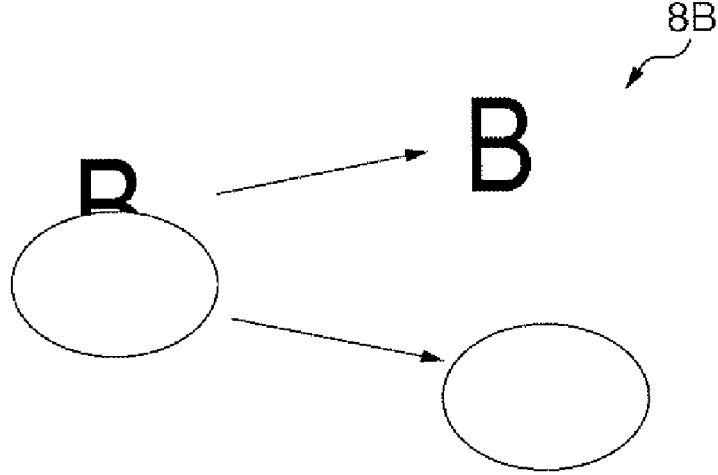
FIG. 8 is a diagram illustrating an example of PDL data according to an embodiment of the present invention.

FIG. 8 is a diagram illustrating an example of PDL data according to the present embodiment, PDL data is data written in high-level language that can be easily edited, and a processing procedure that should be performed by the image processing apparatus is described in the PDL data. In addition, the DPL data is resolution-independent data, which is not dependent on resolution.

As shown in 8A of FIG. 8, a drawing instruction for an ellipse, which has an graphics attribute, is described first, and drawing instructions are then described so that "A", "B" and "C", which have a text attribute, are sequentially overwritten. Here, "overwrite" means that an object that is drawn later is always drawn in front. Since PDL data information is present for each object, even if objects overlap with each other, it is possible to break down the objects, and to know what object the hidden part constitutes, as shown in 8B of FIG. 8. "(X0, Y0)–(X1, Y1)" and so on shown in 8A of FIG. 8 is object drawing position information, which will be described later.

FIG. 9 is a diagram illustrating an example of vector data according to the present embodiment. Vector data is data in which the content indicated by the PDL data is converted into a format that the device can easily execute, and is written in low-level language for which thinning of redundant parts has been carried out, for example. In addition, vector data is resolution-independent data, which is not dependent on resolution. Since vector data is also present for each object as with PDL data, even if objects overlap with each other, it is possible to break down the objects, and to know what object the hidden part constitutes, as shown in 9B of FIG. 9. As shown in 9A of FIG. 9, in the case of the text "A", for example, the data row of the font "A" is specified by the description "character ID=0". Further, the object drawing position information is also indicated for the texts and the ellipse.

FIG. 10 is a diagram illustrating an example of fill map data according to the present embodiment. Unlike PDL data and vector data, fill map data has a single-hierarchy data structure that does not show an overlap between objects. Therefore, fill map data is not present for each object, and is resolution-independent data that indicates, as edge information, how pixels are mapped during rendering.

Therefore, in the case where objects overlap with each other, an object that has ended up underneath another object cannot be restored entirely, as shown in 10B of FIG. 10. However, since fill map data has a single-hierarchy data structure, it provides a feature that various processing (e.g., character recognition and rendering) using fill map can be performed at high speed. As shown in 10A of FIG. 10, for example, the left-edge coordinate and the right-edge coordinate on the same y-coordinate, such as "(X2/X3)", are described as edge information. The fact that a portion indicated by the edge information represented by the coordinates is text information or graphics information is also described. When performing rendering on fill map data as shown in FIG. 10, rendering is carried out in order from the fill map data at the top row to the fill map data at the bottom row as indicated by the arrow.

Algorithm for Character Recognition Processing

Hereinafter, an outline of an algorithm for character recognition processing according to the present embodiment will be described.

Figure 11:
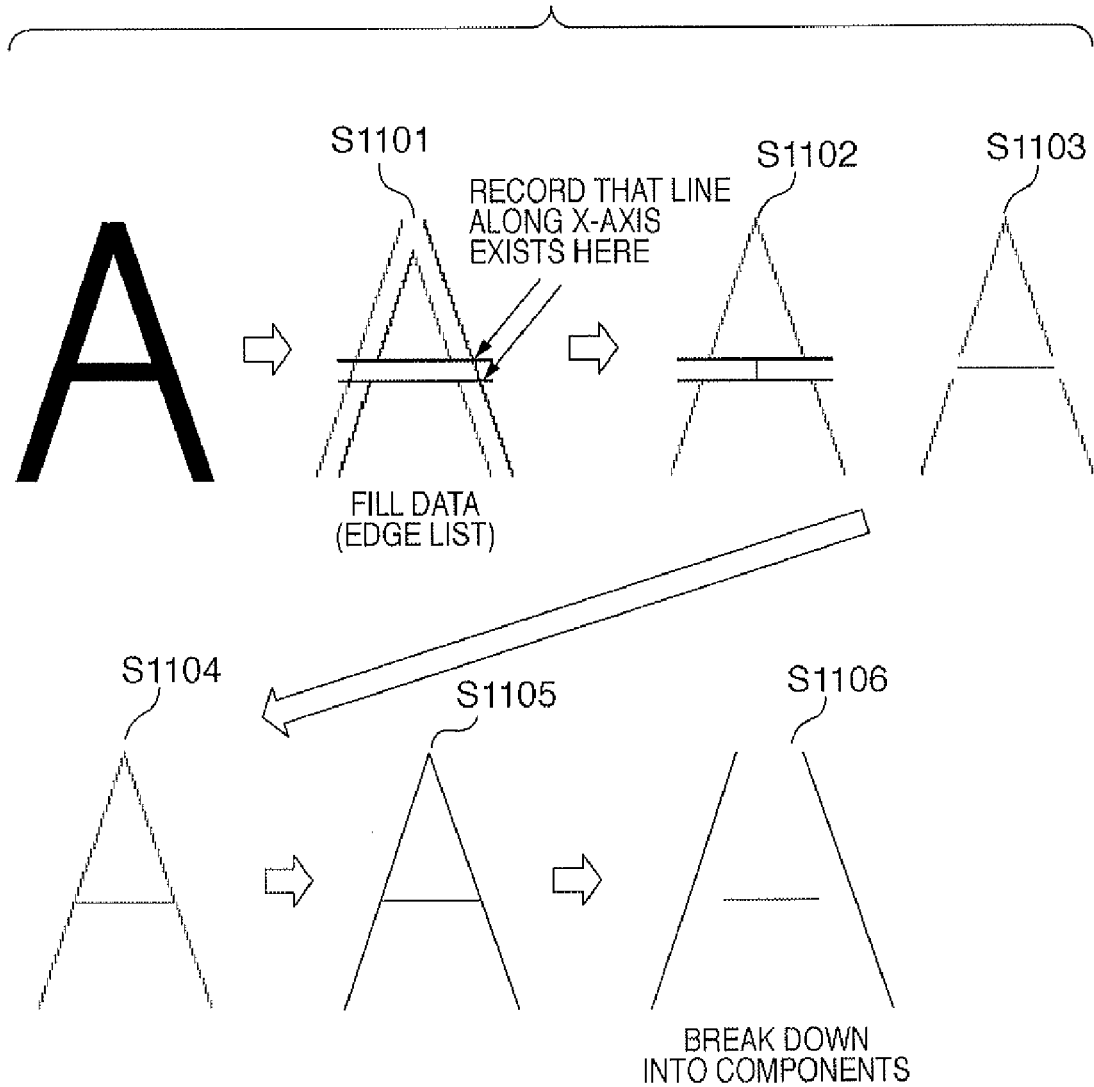
FIG. 11 is a diagram illustrating an outline of an algorithm for character recognition processing performed on fill map data.

FIG. 11 is a diagram illustrating an outline of an algorithm for character recognition processing performed on fill map data. First, in step S1101, a set of edge lists in which the fill area during rendering is represented by the left and right coordinates are generated for fill map data. This is the same as described with reference to FIG. 10. Next, the midpoint of the edge lists along the x-axis is derived in step S1102, and a line that should exist along the x-axis is interpolated at step S1103.

Next, intersection points and lines that should exist are interpolated in step S1104, and, in step S1105, the gradients between line segments are quantized, and the features (components) of the character are extracted. Next, in step S1106, the components of the character are broken down, and character recognition is performed by selecting a character that is closest to the characteristics of the extracted components.

Figure 12:
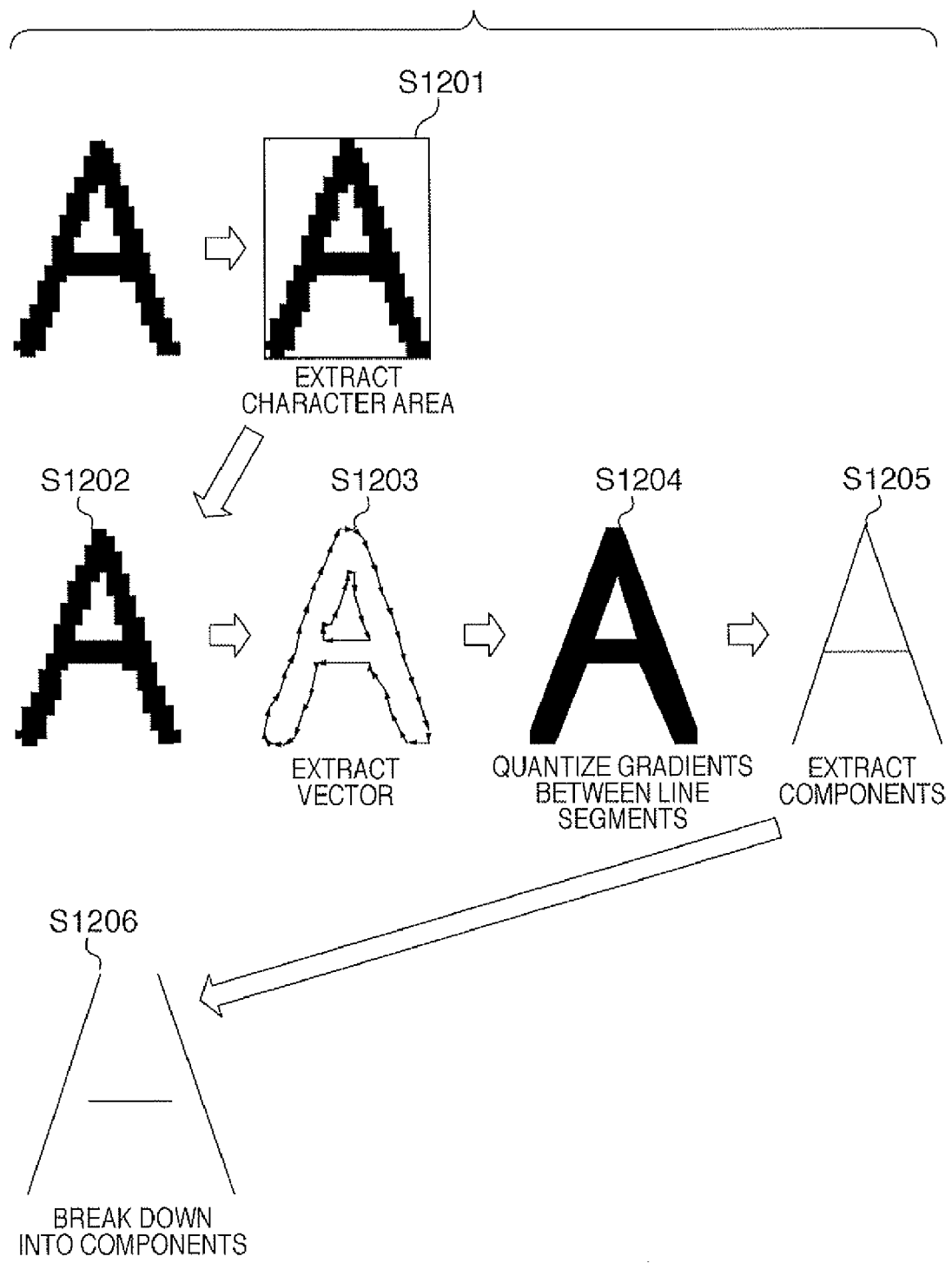
FIG. 12 is a diagram illustrating an outline of an algorithm for character recognition processing performed on bitmap data.

FIG. 12 a diagram illustrating an outline of an algorithm for character recognition processing performed on bitmap data. For characters written in bitmap data, it is necessary to identify the location of a single character. Therefore, in step S1201, the image processing apparatus first extracts a character area. For the extraction of the character area, a commonly-used algorithm can be employed, including, for example, a method in which an isolated character is extracted using a histogram. Next, a character to be recognized is extracted in step S1202, and the vectors of the edges of the character is extracted in step S1203. In step S1204, the gradients between line segments are quantized for the extracted vectors, and in step S1205, the features (components) of the character is extracted. In step S1206, the components of the character are broken down, and character recognition is performed by selecting a character that is closest to the characteristics of the extracted components.

Regarding Object Drawing Position Information

Hereinafter, the object drawing position information used in the present embodiment will be described.

FIG. 13 is a diagram illustrating object drawing position information. In 13A of FIG. 13, the fact that the character string "ABC" is drawn, and only "B" is drawn on an ellipse is described as PDL data. In such a case, the PDL data is described such that an ellipse is drawn over with a graphics attribute, and "ABC" is subsequently drawn over with a text attribute.

As has also been described with reference to FIG. 8, object drawing position information is defined for each object. Here, the object drawing position information includes coordinate information representing the drawing area of each object. The drawing position information is provided for the purpose of calculating the memory size that the device secures for each object, and is basically expressed as a rectangular area circumscribing an object at the top, bottom, left and right so that unnecessary memory will not be used. 13B of FIG. 13 shows drawing position information. In the present embodiment, whether there is an overlap between objects is determined by checking the overlap of this drawing position information.

Furthermore, which of a plurality of objects will be located in front can be determined based on the drawing order of the objects described in the PDL data, and the specified drawing method such as overwriting. For example, in the example shown in 13A of FIG. 13, "C", "B", "A", and the ellipse will be located in this order starting from the front. As shown in 13C of FIG. 13, the depth of the hierarchy increases in ascending order from "C", "B", "A" and the ellipse, as viewed from the user. As has been described thus far, according to the present embodiment, it is possible to determine whether an object has ended up behind another object.

Figure 14:
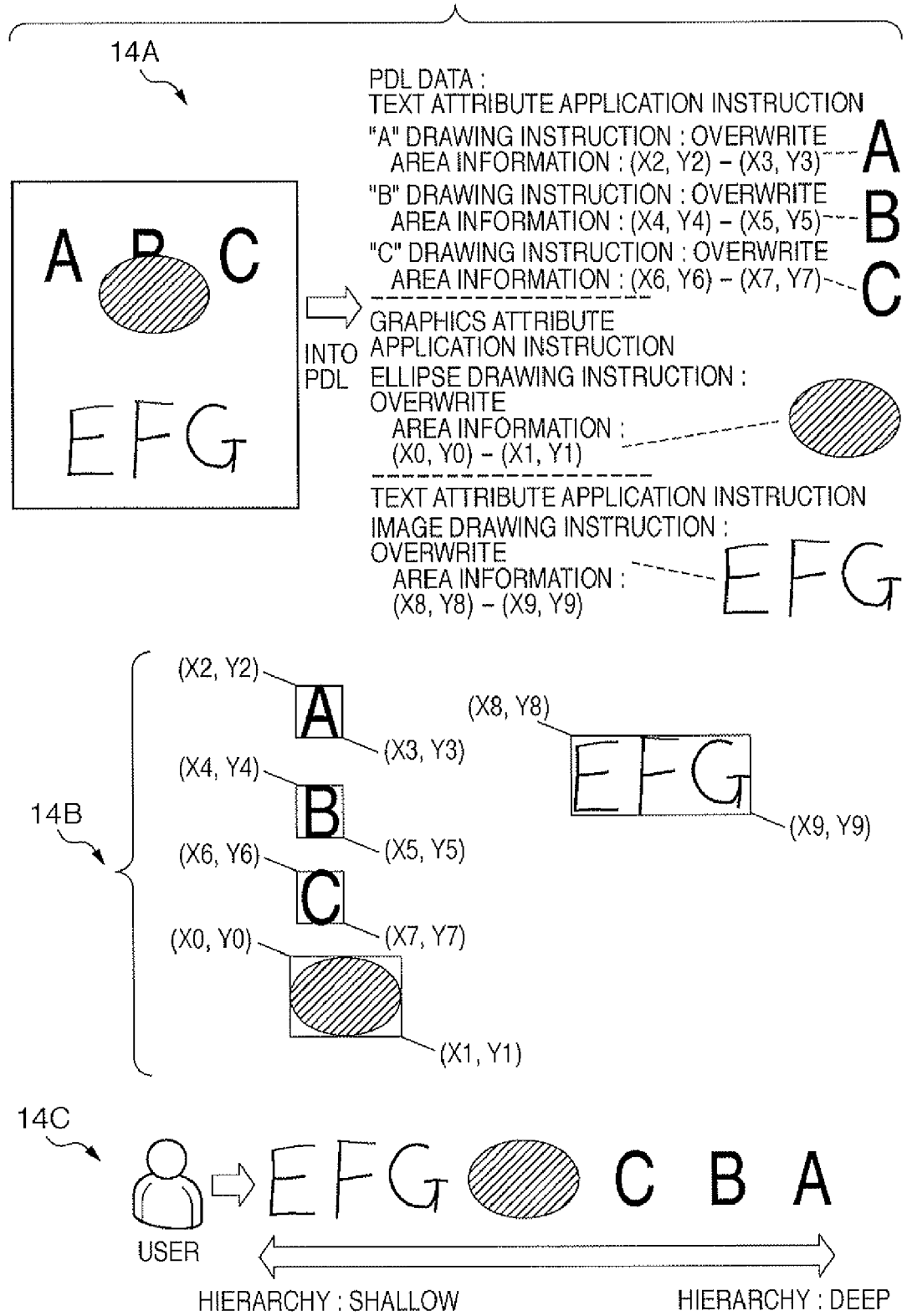
FIG. 14 is a other diagram illustrating object drawing position information.

FIG. 14 is a other diagram illustrating object drawing position information. In 14A of FIG. 14, the fact that the character string "ABC" is drawn, an ellipse is drawn over "B", and "EFG" is additionally drawn is described as PDL data. Here, "EFG" is an object captured by scanning a handwritten character, and "EFG" are collectively handled as a single bitmap data object. In the case shown in 14A of FIG. 14, the PDL data is described such that "ABC" is drawn over with a text attribute, an ellipse is subsequently drawn over with a graphics attribute, and the bitmap data of "EFG" is subsequently drawn over with a text attribute. In 14B of FIG. 14, drawing position information in the case shown in 14A of FIG. 14 is illustrated.

As with "ABC", "EFG", which is a bitmap data object, is represented as a rectangular area circumscribing an object at the top, bottom, left and right. Therefore, even in the case where different bitmap data objects coexist, whether there is any overlap between the objects can be determined by checking the overlap of the drawing position information. Furthermore, in the case where different bitmap data objects are present together, which of a plurality of objects will be located in front can be determined from the drawing order of the objects that is described in the PDL data and the specified drawing method such as overwriting. For example, in the example shown in 14A of FIG. 14, "EFG", the ellipse, "C", "B", and "A" will be located in this order starting from the front. As shown in 14C of FIG. 14, the depth of the hierarchy increases in ascending order from "EFG", the ellipse, "C", "B", "A", and the ellipse, as viewed from the user. As has been describe thus far, it is possible to determine whether an object has ended up behind another object.

Flow of PDL Data Character Recognition Processing

Figure 15A:
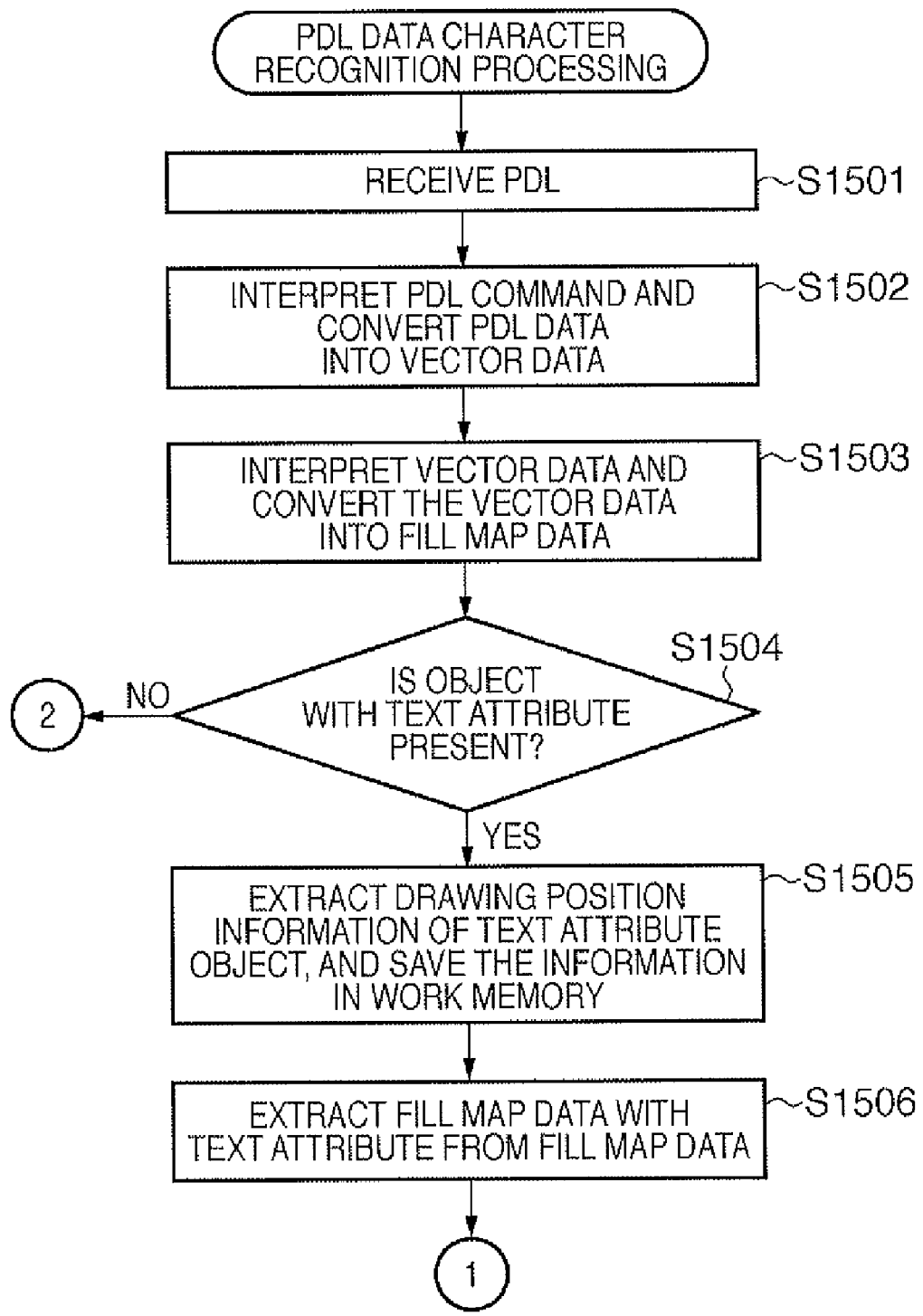
FIG. 15A and FIG. 15B are flowcharts illustrating a procedure of character recognition processing according to an embodiment of the present invention.
Figure 15B:
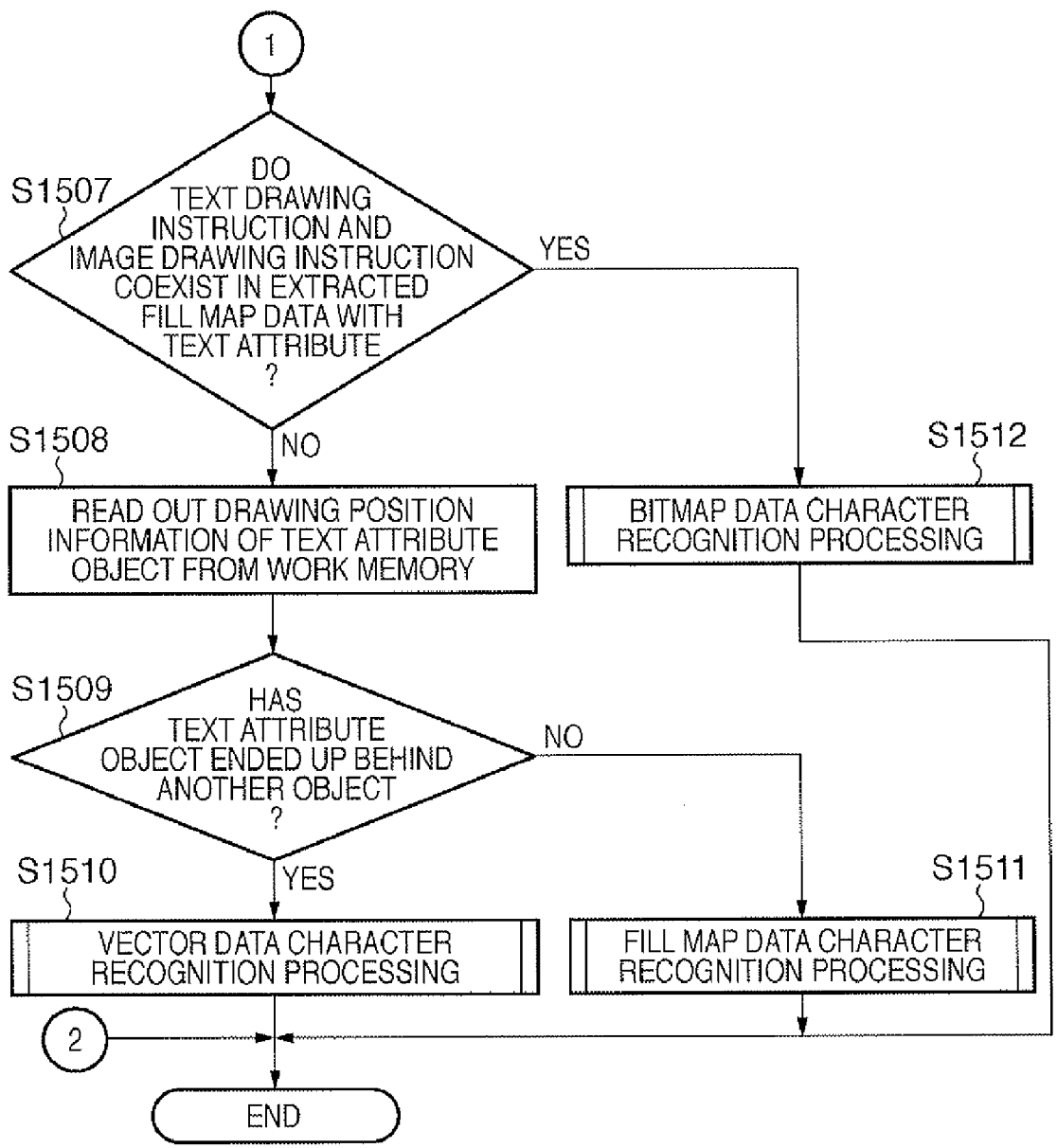

FIGS. 15A and 15B are flowcharts illustrating a procedure of character recognition processing according to the present embodiment.

First, the image processing apparatus receives PDL data as shown in FIG. 8 in step S1501, and the procedure moves to step S1502. In step S1502, the image processing apparatus interprets a PDL command, and converts the PDL data into vector data as shown in FIG. 9, and the procedure moves to step S1503 (first intermediate data generation). In step S1503, the image processing apparatus interprets the vector data, and converts the vector data into fill map data as shown in FIG. 10, and the procedure moves to step S1504 (second intermediate data generation). Here, the converted vector data and fill map data may be stored in a storage area of a memory or the like.

In step S1504, whether an object with a text attribute is present is determined. If it is determined here that such an object is present, the procedure moves to step S1505. On the other hand, if it is determined that such an object is not present, the process ends. The determination at step S1504 may be made based on PDL data as shown in FIG. 8, or may be made based on vector data as shown in FIG. 9.

Next, in step S1505, the drawing position information of the text attribute object is extracted, and stored in the work memory, and the procedure moves to step S1506. Here, the drawing position information of the object may be extracted, for example, from the PDL data, or may be extracted from the vector data. In step S1506, the fill map data with a text attribute is extracted from the fill map data converted in step S1503, and the procedure moves to step S1507.

In step S1507, referring to the extracted fill map data with a text attribute, it is determined whether a text drawing instruction and an image drawing instruction coexist. Objects with a text attribute can be classified into a text drawing object and an image drawing object. "Text drawing object" is an object described by a text drawing instruction instructing drawing of a character string such as "ABC". "Image drawing object" is an object described by an image drawing instruction instructing drawing of an ornamental character such as WordArt. For example, an ordinary object in which a text character and an ornament character are integrated as one has a text attribute; however, a text drawing instruction and an image drawing instruction coexist as drawing instructions. In the present embodiment, for such an object with a text attribute, in step S1512, rendering is performed on the fill map data, thereby generating bitmap data, and character recognition processing is performed on the bitmap data.

On the other hand, if it is determined that a text drawing instruction and an image drawing instruction do not coexist in single extracted fill map data (a group of drawing instructions) with a text attribute, the procedure moves to step S1508. The processing in step S1507 is performed on all the fill map data with a text attribute included in a document.

In step S1508, the drawing position information of the stored object with a text attribute is read out from the work memory, and the procedure moves to step S1509.

Figure 16:
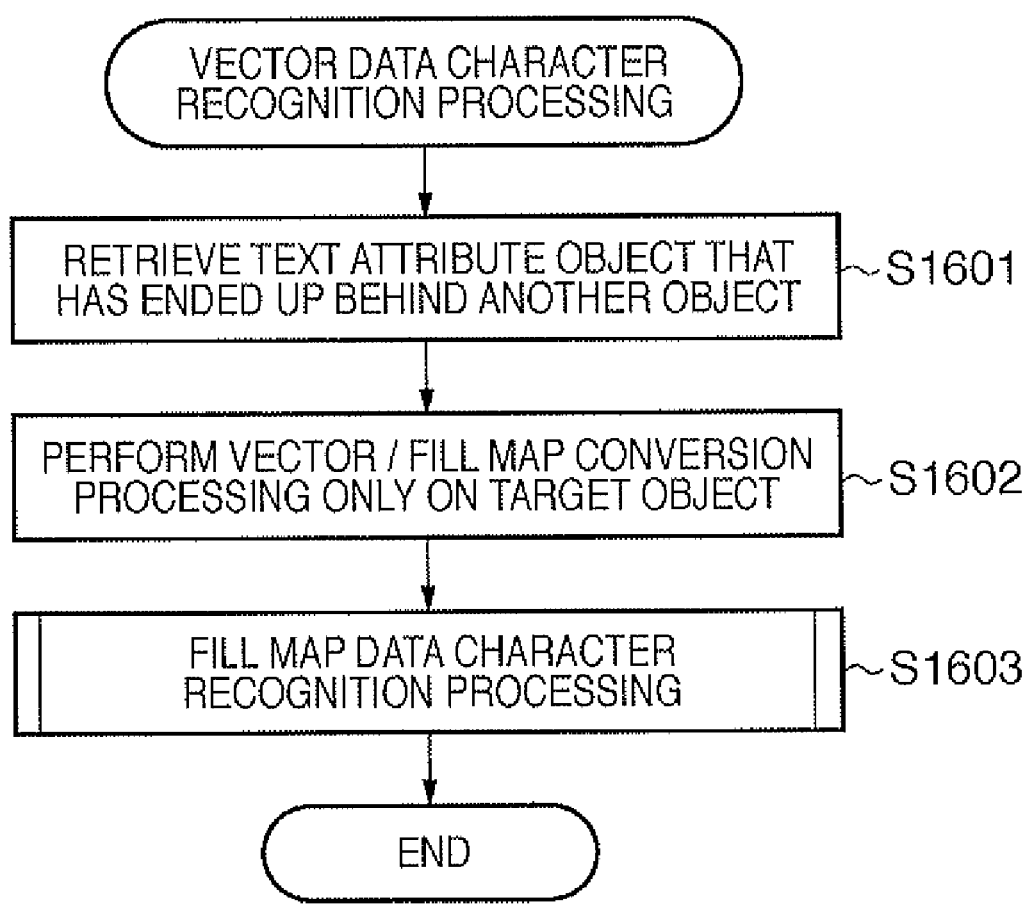
FIG. 16 is a flowchart illustrating a procedure of character recognition processing on vector data shown at step S1510 in FIGS. 15A and 15B.
Figure 17:
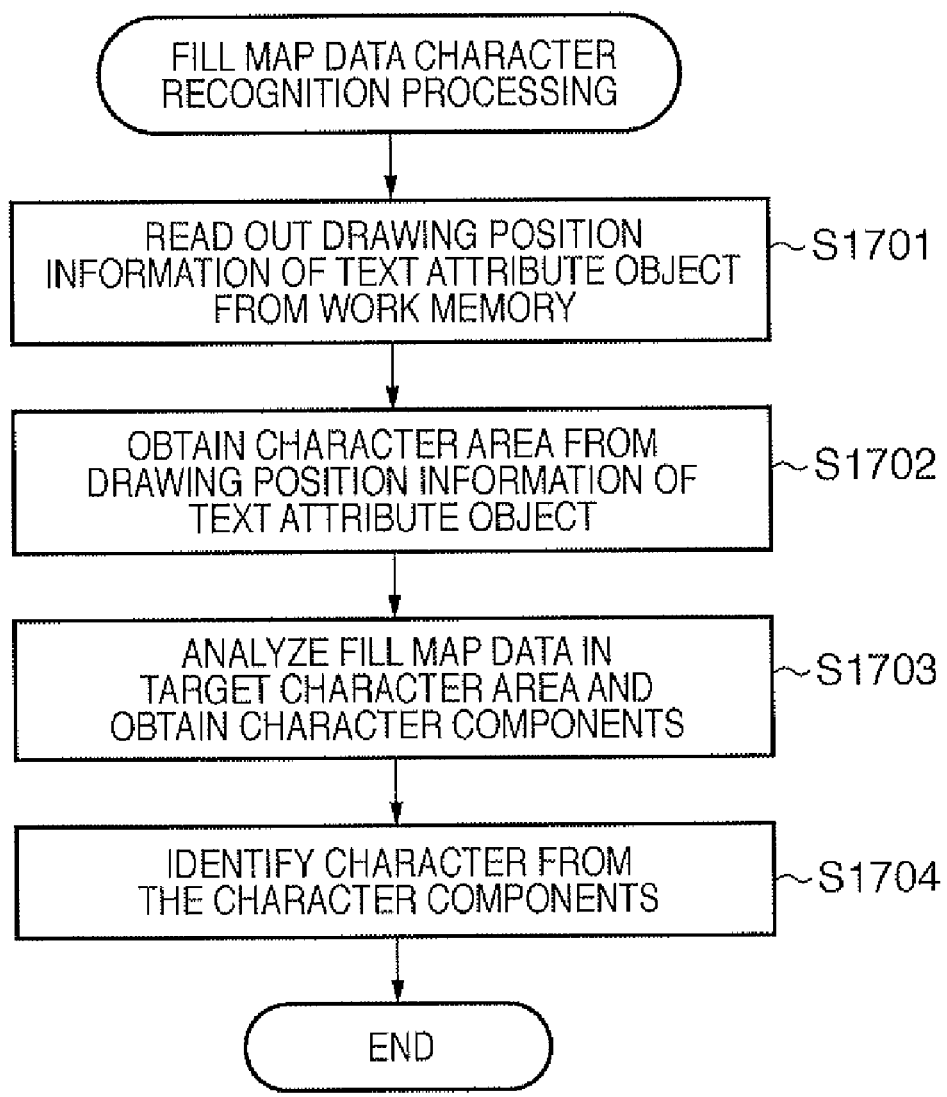
FIG. 17 is a flowchart illustrating a procedure of character recognition processing on fill map data shown at step S1603 in FIG. 16.

In step S1509, referring to the drawing position information of the read text attribute object, whether the read object has ended up behind another object. Here, if it is determined that the object has ended up behind another object, the procedure moves to step S1510, and the character recognition processing on vector data shown in FIG. 16 is performed only for that object. On the other hand, if it is determined that the object has not ended up behind another object, the procedure moves to step S1511, where the character recognition processing on fill map data shown in FIG. 17 is performed. The processing in step S1509 is performed on all the text attribute objects included in a document. As has been described thus far, character recognition processing suitable for various conditions is performed on a document described with the received PDL data, and then the process ends.

FIG. 16 is a flowchart illustrating a procedure of the character recognition processing on vector data shown at step S1510 in FIGS. 15A and 15B. First, in step S1601, the image processing apparatus retrieves an object with a text attribute that has ended up behind another object, and the procedure moves to step S1602. In step S1602, only on the retrieved object, the vector data is converted into fill map data, and the procedure moves to step S1603. In step S1603, the character recognition processing on fill map data shown in FIG. 17 is performed, and the procedure ends.

FIG. 17 is a flowchart illustrating a procedure of the character recognition processing on fill map data shown in step S1603 of FIG. 16. In step S1701, the image processing apparatus reads out the drawing position information of the object with a text attribute from the work memory, and the procedure moves to step S1702. In step S1702, the image processing apparatus acquires a character area from the drawing position information of the object with a text attribute, and the procedure moves to step S1703. In step S1703, the image processing apparatus analyzes the fill map data in the acquired character area, thereby acquiring character components, and the procedure moves to step S1704. The processing in step S1703 is the same as the processing described with reference to FIG. 11. In step S1704, a character is identified based on the character components, and the process ends.

Figure 18:
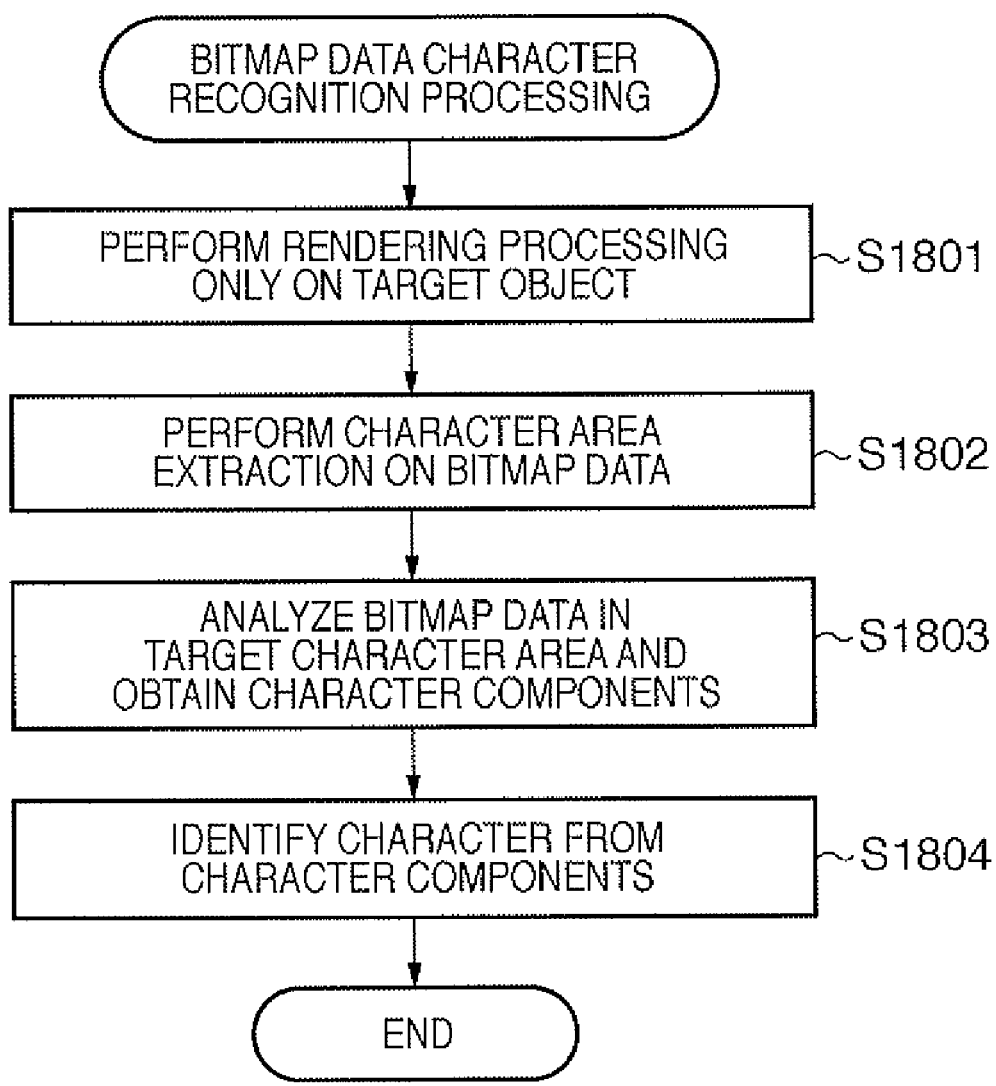
FIG. 18 is a flowchart illustrating a procedure of character recognition processing on bitmap data shown at step S1512 in FIGS. 15A and 15B.

FIG. 18 is a flowchart illustrating a procedure of the character recognition processing on bitmap data shown at step S1512 in FIGS. 15A and 15B. In step S1801, the image processing apparatus performs rendering processing only on a target object, and the procedure moves to step S1802. In step S1802, the image processing apparatus performs character area extraction on bitmap data, and the procedure moves to step S1803. In step S1803, the image processing apparatus analyzes the bitmap data in the target character area, thereby acquiring character components, and the procedure moves to step S1804. The processing in step S1803 is the same as the processing described with reference to FIG. 12. In step S1804, the image processing apparatus identifies a character based on the character components, and the process ends.

As has been described thus far, in the present embodiment, for objects with a text attribute that are included in a document, character recognition processing is performed on intermediate data (fill map data) with edge information generated from PDL data. Furthermore, in the case where there is an overlap between the objects, or where an image drawing instruction with a text attribute is included, character recognition processing is appropriately performed on vector data or bitmap data only for the target portion.

That is, the image processing apparatus according to the present embodiment generates intermediate data (vector data and fill map data) from received PDL data. Furthermore, the image processing apparatus determines whether an object with a text attribute includes an image drawing instruction with a text attribute, and whether the object with a text attribute has ended up behind another object. If an object with a text attribute does not include an image drawing instruction with a text attribute, and has not ended up behind another object, the image processing apparatus performs character recognition processing on fill map data including edge information. On the other hand, if the aforementioned object has ended up behind another object, the image processing apparatus performs character recognition processing on vector data only for the overlapping objects. Furthermore, if an object with a text attribute includes an image drawing instruction with a text attribute, the image processing apparatus performs rendering processing only for that object, and performs character recognition processing. Consequently, the overall character recognition processing can be performed at a higher speed.

Next, an example will be described in which a print document to which character string information obtained using the character recognition processing shown in FIGS. 15A and 15B is added as hint information is stored in a box.

Data Flow of Box Storage

Figure 19:
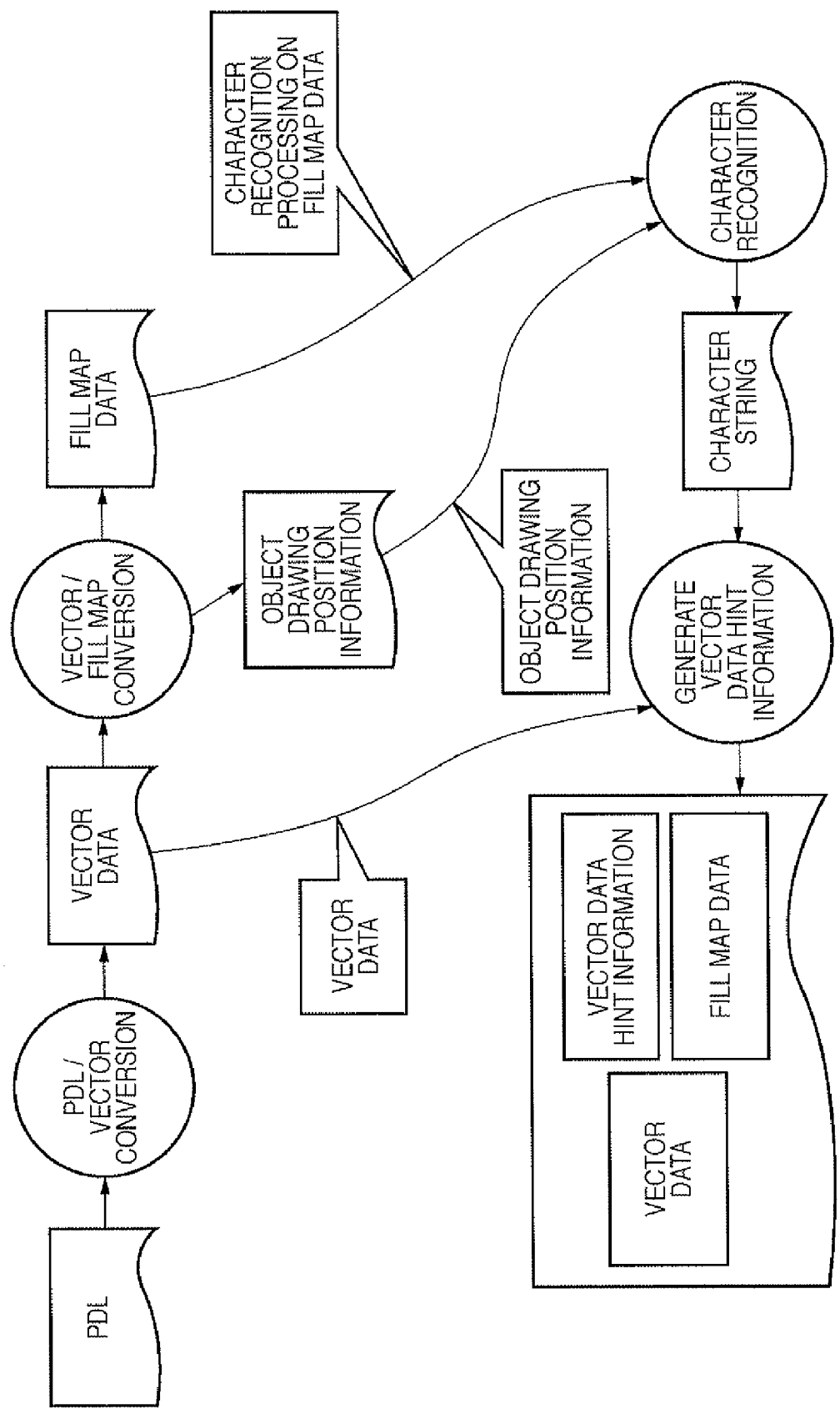
FIG. 19 is a diagram illustrating a case where a character string obtained through character recognition processing on fill map data is used as hint information.

FIG. 19 is a diagram illustrating a case where a character string obtained through character recognition processing on fill map data is used as hint information. As described with reference to FIG. 5, the image processing apparatus performs PDL/vector conversion processing on the PDL data, thereby generating vector data. Then, the image processing apparatus performs vector/fill map conversion processing on the vector data, thereby generating fill map data, and concurrently generates object drawing position information. Then, referring to the object drawing position information, the image processing apparatus performs character recognition processing on the fill map data, thereby generating a character string.

The image processing apparatus further generates vector data hint information in which the generated character string is associated with the vector data, and stores the vector data and the vector data hint information in pair in the document storage unit 311. FIG. 19 shows how a pair of the vector data and the vector data hint information is stored along with the fill map data in the document storage unit 311.

Figure 20:
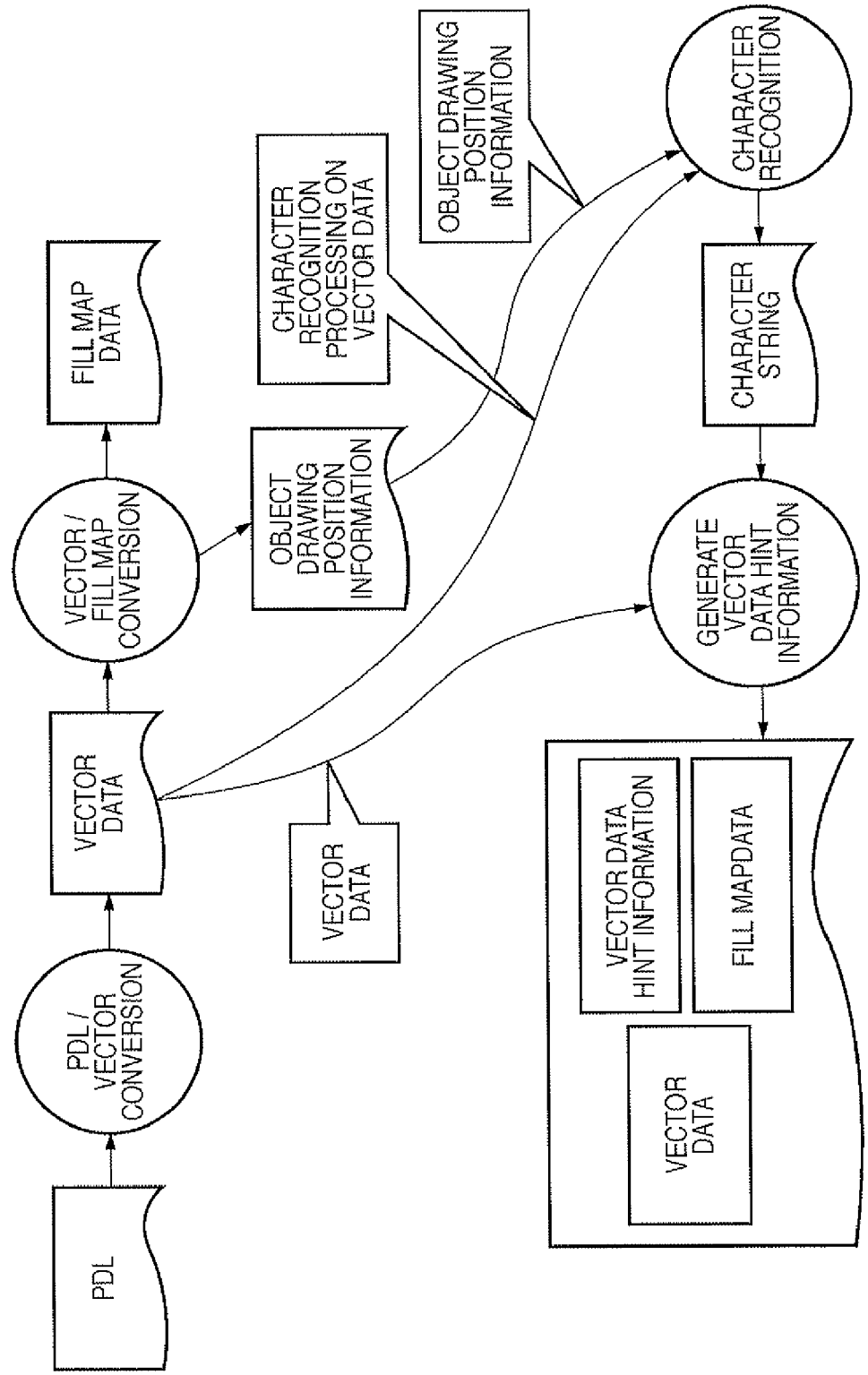
FIG. 20 is a diagram illustrating a case where a character string obtained through character recognition processing on vector data is used as hint information.

FIG. 20 is a diagram illustrating a case where a character string obtained through character recognition processing on vector data is used as hint information. As described with reference to FIG. 6, the image processing apparatus performs PDL/vector conversion processing on the PDL data, thereby generating vector data. Then, the image processing apparatus performs vector/fill map conversion processing on the vector data, thereby generating fill map data, and concurrently generates object drawing position information. Then, referring to the object drawing position information, the image processing apparatus determines whether an object with a text attribute that has ended up behind another object is present, or whether the object is a text attribute object in which an image drawing instruction and a text drawing instruction coexist. Here, if it is determined that both of these two conditions are satisfied, the image processing apparatus extracts the corresponding object from the vector data, and performs the character recognition processing, thereby generating a character string.

The image processing apparatus further generates vector data hint information in which the generated character string is associated with the vector data, and stores the vector data and the vector data hint information in pair in the document storage unit 311. FIG. 20 shows how a pair of the vector data and the vector data hint information is stored along with the fill map data in the document storage unit 311.

Figure 21:
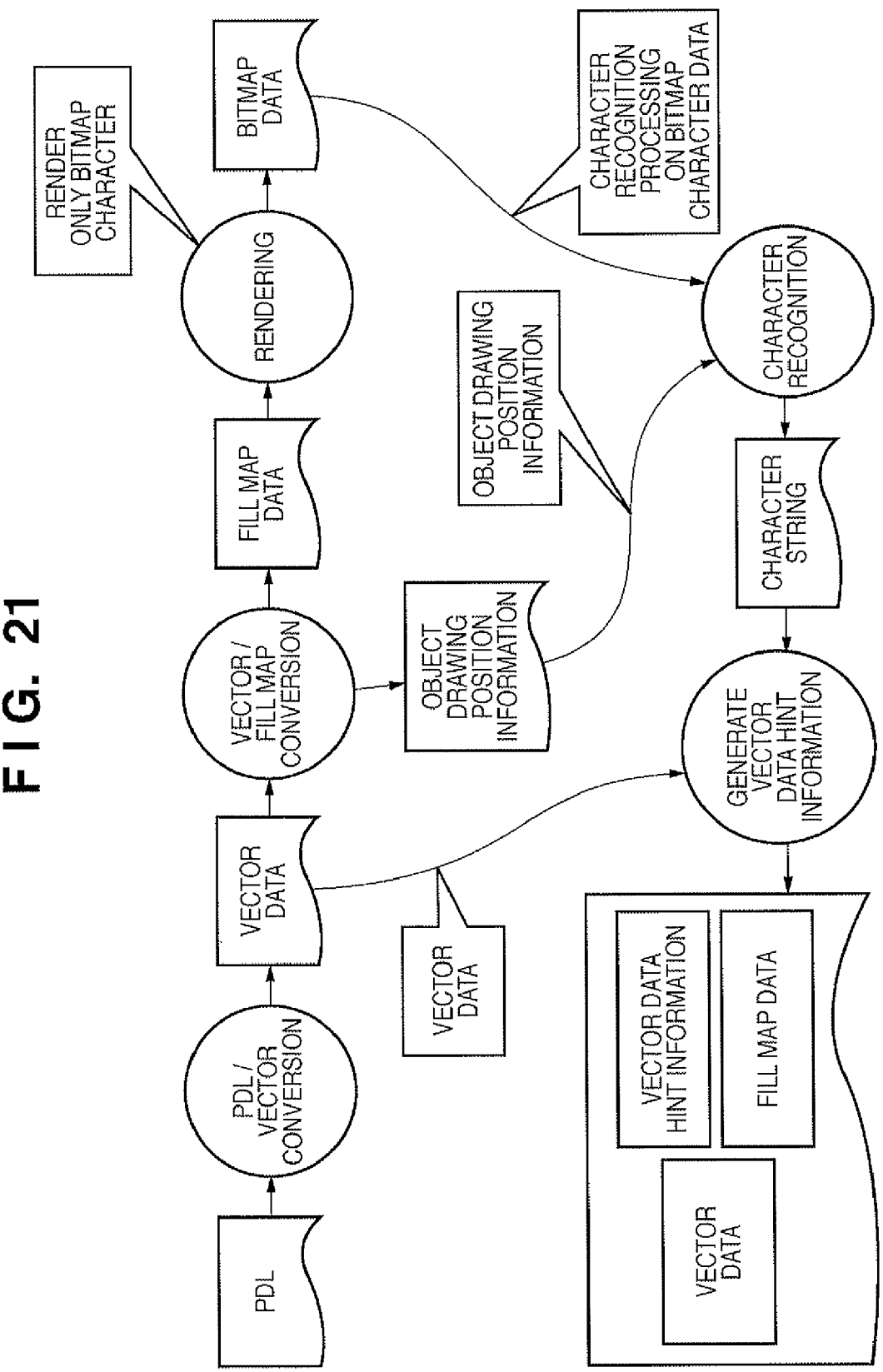
FIG. 21 is a diagram illustrating a case where a character string obtained through character recognition processing on bitmap data is used as hint information.

FIG. 21 is a diagram illustrating a case where a character string obtained through character recognition processing on bitmap data is used as hint information. As described with reference to FIG. 7, the image processing apparatus performs PDL/vector conversion processing on the PDL data, thereby generating vector data. Then, the image processing apparatus performs vector/fill map conversion processing on the vector data, thereby generating fill map data, and concurrently generates object drawing position information. Then, referring to the object drawing position information, the image processing apparatus determines whether the object is a text attribute object in which an image drawing instruction and a text drawing instruction coexist. Here, if it is determined that the object is a text attribute object in which an image drawing instruction and a text drawing instruction coexist, the image processing apparatus performs rendering for that fill map data with a text attribute. Then, the image processing apparatus performs character recognition processing on the generated bitmap data, thereby generating a character string.

The image processing apparatus further generates vector data hint information in which the generated character string is associated with the vector data, and stores the vector data and the vector data hint information in pair in the document storage unit 311. FIG. 21 shows how a pair of the vector data and the vector data hint information is stored along with the fill map data in the document storage unit 311.

Flow of Box Storage Processing

Figure 22:
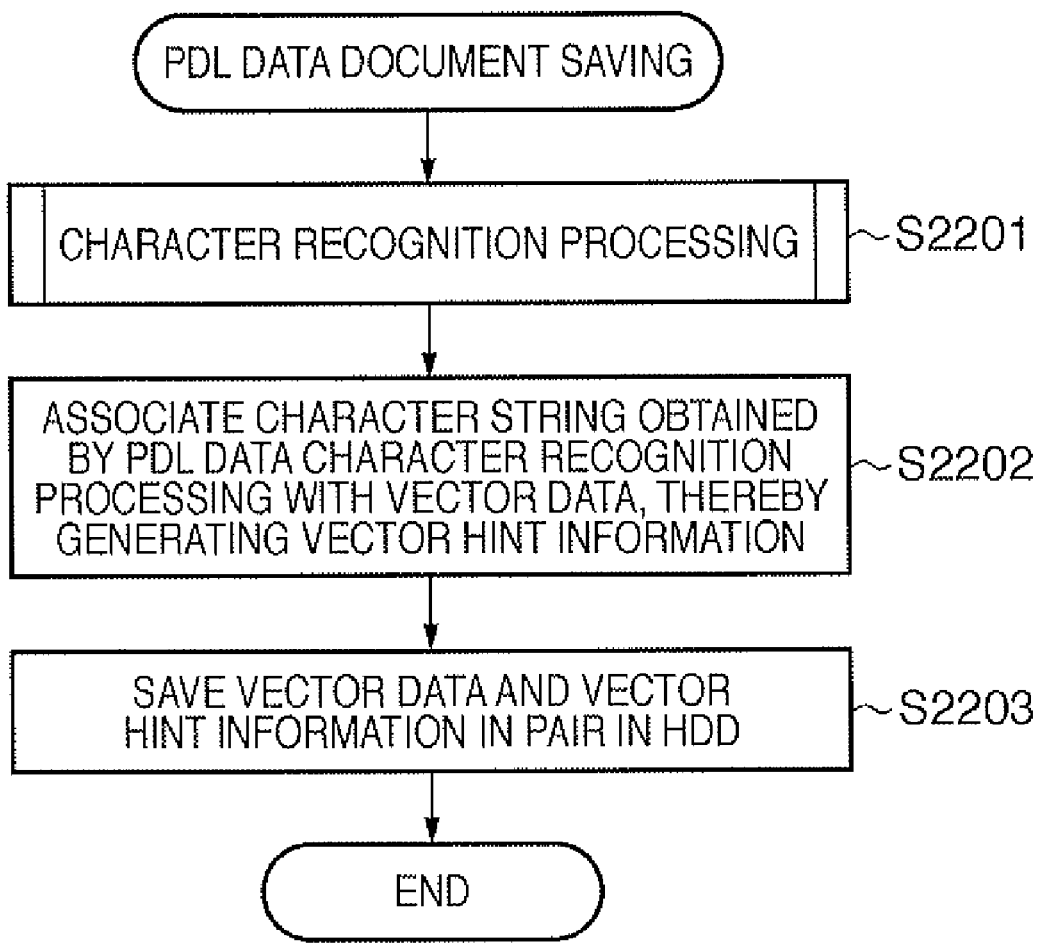
FIG. 22 is a flowchart illustrating a procedure of box storage processing according to an embodiment of the present invention.

FIG. 22 is a flowchart illustrating a procedure of box storage processing according to the present embodiment. First, the image processing apparatus performs the character recognition processing shown in FIGS. 15A and 15B in step S2201, and the procedure moves to step S2202. In step S2202, the character string obtained through the character recognition processing is associated with the vector data, thereby generating vector data hint information, and the procedure moves to step S2203. In step S2203, the vector data and the vector data hint information are stored in pair in the document storage unit 311, and the process ends.

Outline of Vector Data Hint Information

Figure 23:
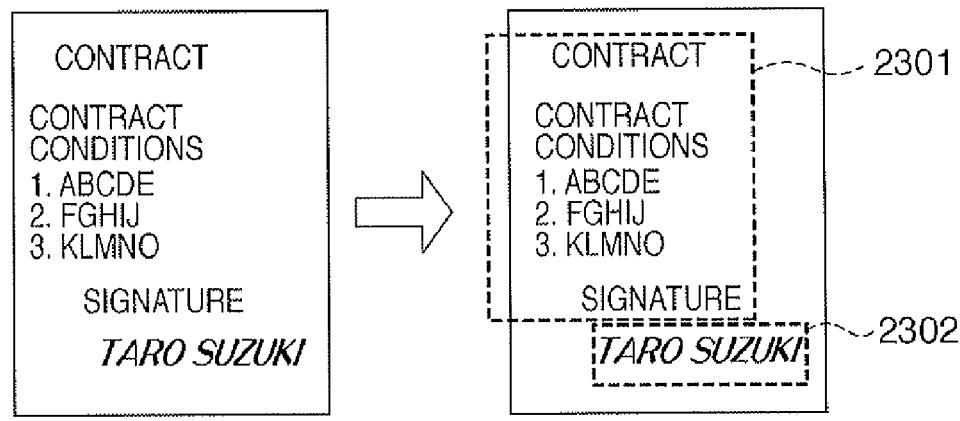
FIG. 23 is a diagram illustrating an outline of vector data hint information according to an embodiment of the present invention.

FIG. 23 is a diagram illustrating an outline of vector data hint information according to the present embodiment. Data as shown in 23A of FIG. 23 will be described as an example. A character string 2301 can be obtained by performing character recognition processing on fill map data with a text attribute. Meanwhile, a character string 2302 is determined as a text drawing instruction with an image attribute in step S1507 in FIGS. 15A and 15B, and can be obtained by performing character recognition processing on bitmap data.

As shown in FIGS. 19 to 21, vector data hint information is generated for each data on which character recognition has been performed, and the generated vector data hint information is stored in the document storage unit 311. 23B of FIG. 23 shows an example of stored vector data hint information. As shown in 23B of FIG. 23, the character string 2301 and the character string 2302 are associated with the file name of the vector data, and separately stored in the document storage unit 311. Accordingly, in the case of retrieving a document stored in the box using a character string, it is possible to separately retrieve the type portion that was originally present in the document and the remaining portion (signature and the like).

The scope of present invention also encompasses a case where an operating system (OS) or the like running on a computer performs part or all of the actual processing in accordance with an instruction of a program (image processing program) coder and the functionalities of the above-described embodiment are realized by that processing. Furthermore, the invention is also applicable to a case where a program code read out from a storage medium is written into a function expansion card inserted into a computer, or a memory included in a function expansion unit connected to a computer. In such a case, a CPU or the like included in that function expansion card or function expansion unit performs part or all of the actual processing in accordance with an instruction by the written program code, and the functionalities of the above-described embodiment is realized by that processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008128791, filed May 15, 2008, which is hereby incorporated by reference herein in its entirety.

What is claimed is:

1. An image processing apparatus that performs character recognition processing of recognizing a character included in a document, the apparatus comprising:
   a receiving unit configured to receive page description data of the document;
   a first intermediate data generating unit configured to convert the page description data received by the receiving unit, thereby generating first intermediate data that is described for each object;
   a second intermediate data generating unit configured to convert the first intermediate data generated by the first intermediate data generating unit, thereby generating second intermediate data that is described with edge information of an object;
   a first storage unit configured to store, in a storage area, data representing drawing position information of an object included in the document;
   a first determining unit configured to, referring to the data representing the drawing position information of an object that is stored by the first storage unit, determine whether the object overlaps with and is located behind another object; and
   a character recognition unit configured to, in the case where it is determined that the object overlaps with and is located behind another object as a result of the determination by the first determining unit, perform character recognition processing on the first intermediate data generated by the first intermediate data generating unit, thereby recognizing a character of the object, and, in the case where it is determined that the object does not overlap with and is not located behind another object, perform character recognition processing on the second intermediate data generated by the second intermediate data generating unit, thereby recognizing a character of the object.

2. The image processing apparatus according to claim 1, wherein the drawing position information is information representing coordinates of a rectangular area that circumscribes an object.

3. The image processing apparatus according to claim 1, further comprising:
   a second determining unit configured to determine whether an object with a text attribute is present in a document,
   wherein, in the case where it is determined that an object with a text attribute is present as a result of the determination by the second determining unit, character recognition processing is performed by the character recognition unit.

4. The image processing apparatus according to claim 3, wherein the object with a text attribute includes at least one of a text drawing object that is described with a text drawing instruction, and an image drawing object that is described with an image drawing instruction, and
   the image processing apparatus further comprises:
   a third determining unit configured to, referring to the second intermediate data generated by the second intermediate data generating unit, determine whether the object with a text attribute includes the image drawing object; and
   a bitmap data generating unit configured to, in the case where it is determined that the object with a text attribute includes the image drawing object as a result of the determination by the third determining unit, render the second intermediate data, thereby generating bitmap data,
   wherein the character recognition unit performs character recognition processing on the bitmap data generated by the bitmap data generating unit, and,
   in the case where it is determined that the object with a text attribute does not include the image drawing object as a result of the determination by the third determining unit, performs character recognition processing on the first intermediate data generated by the first intermediate data generating unit, or on the second intermediate data generated by the second intermediate data generating unit.

5. The image processing apparatus according to claim 4, wherein the character recognition unit recognizes a character by extracting components constituting the character from the generated second intermediate data, or from the generated bitmap data.

6. The image processing apparatus according to claim 1, further comprising
   a second storage unit configured to store, in a storage area, a character string including a character recognized by the character recognition unit along with the first intermediate data, in association with the document.

7. An image processing method performed in an image processing apparatus that performs character recognition processing of recognizing a character included in a document, the method comprising:
   a receiving step of receiving page description data of the document;
   a first intermediate data generating step of converting the page description data received in the receiving step, thereby generating first intermediate data that is described for each object;
   a second intermediate data generating step of converting the first intermediate data generated in the first intermediate data generating step, thereby generating second intermediate data that is described with edge information of an object;

a first determining step of determining, referring to data representing drawing position information of an object included in the document, whether the object overlaps with and is located behind another object; and a character recognition step of, in the case where it is determined that the object included in the document overlaps with and is located behind another object as a result of the determination in the first determining step, performing character recognition processing on the first intermediate data generated in the first intermediate data generating step, thereby recognizing a character of the object, and, in the case where it is determined that the object included in the document does not overlap with and is not located behind another object, performing character recognition processing on the second intermediate data generated in the second intermediate data generating step, thereby recognizing a character of the object.

8. A non-transitory computer-readable storage medium that stores an image processing program for performing character recognition processing of recognizing a character included in a document, the image processing program causing a computer to perform functions of:

receiving page description data of the document;

converting the received page description data, thereby generating first intermediate data that is described for each object;

converting the generated first intermediate data, thereby generating second intermediate data that is described with edge information of an object;

determining, referring to data representing drawing position information of an object included in the document, whether the object overlaps with and is located behind another object; and, in the case where it is determined that the object included in the document overlaps with and is located behind another object as a result of the determination, performing character recognition processing on the generated first intermediate data, thereby recognizing a character of the object, and, in the case where it is determined that the object included in the document does not overlap with and is not located behind another object, performing character recognition processing on the generated second intermediate data, thereby recognizing a character of the object.

* * * * *